United States Patent
Covaci et al.

(10) Patent No.: US 11,546,162 B2
(45) Date of Patent: Jan. 3, 2023

(54) SYSTEMS AND METHODS FOR ENSURING CORRECT EXECUTION OF COMPUTER PROGRAM USING A MEDIATOR COMPUTER SYSTEM

(71) Applicant: nChain Licensing AG, Zug (CH)

(72) Inventors: Alexandra Covaci, Canterbury (GB); Simone Madeo, London (GB); Patrick Motylinski, London (GB); Stephane Vincent, Luxembourg (LU)

(73) Assignee: nChain Licensing AG, Zug (CH)

( * ) Notice: Subject to any disclaimer, the term of this patent is extended or adjusted under 35 U.S.C. 154(b) by 27 days.

(21) Appl. No.: 16/762,487

(22) PCT Filed: Oct. 30, 2018

(86) PCT No.: PCT/IB2018/058491
§ 371 (c)(1),
(2) Date: May 7, 2020

(87) PCT Pub. No.: WO2019/092552
PCT Pub. Date: May 16, 2019

(65) Prior Publication Data
US 2021/0226795 A1 Jul. 22, 2021

(30) Foreign Application Priority Data

Nov. 9, 2017 (GB) .................................... 1718505
Nov. 30, 2017 (GB) .................................... 1719998
(Continued)

(51) Int. Cl.
*H04L 9/32* (2006.01)
*H04L 9/08* (2006.01)
(Continued)

(52) U.S. Cl.
CPC ........ *H04L 9/3221* (2013.01); *G06V 10/7557* (2022.01); *H04L 9/085* (2013.01);
(Continued)

(58) Field of Classification Search
None
See application file for complete search history.

(56) References Cited

U.S. PATENT DOCUMENTS

| 4,667,290 A | 5/1987 | Goss et al. |
| 5,297,150 A | 3/1994 | Clark |

(Continued)

FOREIGN PATENT DOCUMENTS

| CN | 107179932 A | 9/2017 |
| CN | 107274184 A | 10/2017 |

(Continued)

OTHER PUBLICATIONS

Parno, "A Note on the Unsoundness of vnTinyRAM's SNARK," retrieved from https://eprint.iacr.org/2015/437, May 6, 2015, 4 pages.

(Continued)

*Primary Examiner* — Bassam A Noaman
(74) *Attorney, Agent, or Firm* — Davis Wright Tremaine LLP

(57) ABSTRACT

In a distributed system, a first computer system may require computationally verifiable assurances of the authenticity and integrity of computations (e.g., performed as part of the execution of a program) performed by a second computer system. Methods described herein may be utilized to enforce and/or ensure the correct execution of a program. The first computer system may delegate execution of a program to a second computer system and a protocol may be employed to constrain the second computer system to perform a correct execution of the program. The protocol may include miti- (Continued)

gation and correction routines that mitigate and/or correct the incorrect execution of a program. In various systems and methods described herein, the protocol may utilize a blockchain network such as a Bitcoin-based blockchain network.

17 Claims, 11 Drawing Sheets

(30) Foreign Application Priority Data

Dec. 13, 2017 (GB) .................................. 1720768
Dec. 15, 2017 (GB) .................................. 1720946
Apr. 10, 2018 (GB) .................................. 1805948
Apr. 20, 2018 (GB) .................................. 1806444

(51) Int. Cl.
*G06V 10/75* (2022.01)
*H04L 9/00* (2022.01)

(52) U.S. Cl.
CPC .......... *H04L 9/0825* (2013.01); *H04L 9/0894* (2013.01); *H04L 9/3236* (2013.01); *H04L 9/3247* (2013.01); *H04L 9/50* (2022.05)

(56) References Cited

U.S. PATENT DOCUMENTS

| | | |
|---|---|---|
| 5,404,531 A | 4/1995 | Wakatani |
| 5,499,191 A | 3/1996 | Young |
| 5,920,830 A | 7/1999 | Hatfield et al. |
| 6,519,754 B1 | 2/2003 | McElvain et al. |
| 7,085,701 B2 | 8/2006 | Rich et al. |
| 7,281,017 B2 | 10/2007 | Hostetter et al. |
| 9,026,978 B1 | 5/2015 | Liu et al. |
| 9,483,596 B1 | 11/2016 | Badar et al. |
| 2003/0125917 A1 | 7/2003 | Rich et al. |
| 2004/0015739 A1 | 1/2004 | Heinkel et al. |
| 2007/0061487 A1 | 3/2007 | Moore et al. |
| 2007/0157132 A1 | 7/2007 | Cheng et al. |
| 2008/0127067 A1* | 5/2008 | Aubertine ........... G06F 9/45508 717/115 |
| 2010/0067686 A1 | 3/2010 | Minematsu |
| 2010/0131933 A1 | 5/2010 | Kim et al. |
| 2010/0272209 A1* | 10/2010 | Lee ......................... H04L 1/007 375/295 |
| 2014/0321644 A1 | 10/2014 | Lemieux |
| 2016/0004820 A1 | 1/2016 | Moore |
| 2016/0162897 A1 | 6/2016 | Feeney |
| 2016/0283941 A1 | 9/2016 | Andrade |
| 2016/0357948 A1* | 12/2016 | Takeuchi ............... G06Q 50/00 |
| 2017/0091750 A1 | 3/2017 | Maim |
| 2017/0131983 A1 | 5/2017 | Roytman et al. |
| 2017/0132619 A1 | 5/2017 | Miller et al. |
| 2017/0142103 A1 | 5/2017 | Bringer et al. |
| 2017/0177312 A1 | 6/2017 | Boehm et al. |
| 2017/0178263 A1 | 6/2017 | Kraemer et al. |
| 2017/0180341 A1* | 6/2017 | Walker .................. H04L 9/3242 |
| 2017/0220815 A1* | 8/2017 | Ansari .................... G06Q 10/06 |
| 2017/0249716 A1 | 8/2017 | Meixner et al. |
| 2017/0277909 A1 | 9/2017 | Kraemer et al. |
| 2017/0278100 A1 | 9/2017 | Kraemer et al. |
| 2017/0279611 A1 | 9/2017 | Kraemer et al. |
| 2017/0286079 A1 | 10/2017 | Cho et al. |
| 2017/0286717 A1 | 10/2017 | Khi et al. |
| 2017/0287090 A1 | 10/2017 | Hunn et al. |
| 2017/0317834 A1 | 11/2017 | Smith et al. |
| 2017/0337319 A1 | 11/2017 | Camus et al. |
| 2017/0352209 A1 | 12/2017 | Keuffer et al. |
| 2017/0353309 A1 | 12/2017 | Gray |
| 2018/0034634 A1 | 2/2018 | Benarroch Guenun et al. |
| 2018/0039667 A1* | 2/2018 | Pierce .................... G06Q 40/04 |
| 2018/0117446 A1 | 5/2018 | Tran et al. |
| 2018/0167201 A1 | 6/2018 | Naqvi |
| 2019/0138753 A1* | 5/2019 | Wallrabenstein ..... H04L 9/0866 |
| 2019/0295182 A1* | 9/2019 | Kfir ......................... G06F 16/00 |

FOREIGN PATENT DOCUMENTS

| | | |
|---|---|---|
| EP | 3249599 A1 | 11/2017 |
| JP | 5697153 B2 | 4/2015 |
| WO | 2016155804 A1 | 10/2016 |
| WO | 2016206567 A1 | 12/2016 |
| WO | WO 2017/008829 A1 * | 1/2017 |
| WO | 2017079652 A1 | 5/2017 |
| WO | 2017148527 A1 | 9/2017 |
| WO | 2017178956 A1 | 10/2017 |
| WO | 2018127446 A1 | 7/2018 |
| WO | 2018127456 A2 | 7/2018 |

OTHER PUBLICATIONS

Prasad et al., "Effect pf Quine-McCluskey Simplification on Boolean Space Complexity," IEEE Xplore, Jul. 25-26, 2009, 6 pages.
Ritzdorf et al., "TLS-N: Non-repudiation over TLS Enabling Ubiquitous Content Signing for Disintermediation," IACR ePrint report, first disclosed 2017 [retrieved May 2, 2018], 16 pages.
Satoshi et al., "Connection Limits," Bitcoin Forum, Aug. 9, 2010, https://bitcointalk.org/index.php?topic=741.0; prev_next=prev, 2 pages.
Schaeffer et al., "ZoKrates—a Toolbox for zkSNARKS on Ethereum," https://github.com/Zokrates/ZoKrates, Feb. 4, 2019, 3 pages.
Stuart, "EECS Presents Awards for Outstanding PhD and SM Theses," EECS, Nov. 8, 2017, 2 pages.
Sward et al. "Data Insertion in Bitcoin's Blockchain" [online] Augustana College, Jul. 2017 [retrieved Feb. 10, 2022]. Retrieved from the Internet: URL: https://digitalcommons.augustana.edu/cgi/viewcontent.cgi?article=1000&context=cscfaculty 2017, 19 pages.
Teutsch et al., "A scalable verification solution for blockchains," Nov. 16, 2017, https://people.cs.uchicago.edu/~teutsch/papers/truebit.pdf, 50 pages.
Todd, "[bitcoin-dev] Building Blocks of the State Machine Approach to Consensus," petertodd.org, Jun. 20, 2016, https://lists.linuxfoundation.org/pipermail/bitcoin-dev/2016-June/012773.html, six pages.
Turner, "Designing Digital Circuits a modem approach," CSE 260, Introduction to Digital Logic and Computer Design, Spring 2014, 435 pages.
UK Commercial Search Report dated Dec. 3, 2018, Patent Application No. GB1806444.4, 8 pages.
UK Commercial Search Report dated Feb. 2, 2018, Patent Application No. GB 1718505.9, 7 pages.
UK Commercial Search Report dated May 31, 2018, Patent Application No. GB1801753.3, 8 pages.
UK Commercial Search Report dated Oct. 25, 2018, Patent Application No. GB1805948.5, 9 pages.
UK IPO Search Report dated Jul. 26, 2018, Patent Application No. GB1801753.3, 5 pages.
UK IPO Search Report dated Nov. 2, 2018, Patent Application No. GB1805948.5, 4 pages.
UK IPO Search Report dated Nov. 8, 2018, Patent Application No. GB1806444.4, 6 pages.
United Kingdom Commercial Search Report dated Apr. 20, 2018, Patent Application No. 1720768.9, filed Dec. 13, 2017, 8 pages.
United Kingdom Intellectual Property Office Search Report dated Jun. 12, 2018, Patent Application No. 1720768.9, filed Dec. 13, 2017, 7 pages.
United Kingdom Intellectual Property Office Search Report dated May 3, 2018, Patent Application No. 1719998.5, filed Nov. 30, 2017, 6 pages.
United Kingdom IPO Search Report dated Apr. 27, 2018, Patent Application No. 1718505.9, filed Nov. 9, 2017, 5 pages.
Viacoin Dev Team, "Styx: Unlinkable Anonymous Atomic Payment Hub For Viacoin," viacoin.org, Oct. 14, 2016, http://docplayer.net/35213119-Styx-unlinkable-anonymous-atomic-payment-hub-for-viacoin-viacoin-dev-team-viacoin-org.html, 18 pages.

(56) References Cited

OTHER PUBLICATIONS

Virza, "On Deploying Succinct Zero-Knowledge Proofs" [online] MIT, Sep. 2017 [retrieved Feb. 10, 2022], Retrieved from the Internet: URL: On Deploying Succinct Zero-Knowledge Proofs, 2016, 131 pages.
Wikipedia, "Precompiled Header," Retrieved Mar. 30, 2022, https://en.wikipedia.org/w/index.php?title=Precompiled_header&oldid=807155683, 3 pages.
Wikipedia, "Zero Knowledge Contingent Payment," Bitcoin Wiki, retrieved from https://en.bitcoin.it/wiki/Zero_Knowledge_Contingent_Payment, Apr. 8, 2020, 3 pages.
Wu et al., "Libsnark: a C++ Library for zkSNARK Proofs," SCIPR Lab, libsnark/README.md at 92a80f74727091fdc40e602-1dc42e9f6b67d5176, Aug. 18, 2017, 9 pages.
ZCash, "zk-SNARKs," zCash website, retreived Apr. 1, 2022 from https://web.archive.org/web/20171107012237/https://z.cash/technology/zksnarks.html, Nov. 24, 2017, 1 page.
Turner, "CSE 260. Introduction to Digital Logic and Computer Design," Syllabus and Text Book, https://www.arl.wustl.edu/-jst/cse/260/ddc.pdf, 2015, 435 pages.
Antonopoulos, "Mastering Bitcoin—Unlocking Digital Cryptocurrencies," O'Reilly Media, Inc., Dec. 20, 2014, 282 pages.
Ben-Sasson et al. "Scalable Zero Knowledge via Cycles of Elliptic Curves" [online] IACR, Sep. 18, 2016 [retrieved Feb. 10, 2022]. Retrieved from https://eprint.iacr.org/2014/595.pdf, 2016, 49 pages.
Ben-Sasson et al., "SNARKs for C: Verifying program executions succinctly and in zero knowledge," Advances in Cryptology—CRYPTO 2013, Aug. 18, 2013, 19 pages.
Ben-Sasson et al., "Succinct Non-Interactive Zero Knowledge for a von Neumann Architecture," USENIX Security 2014, first disclosed Dec. 30, 2013, last revised May 19, 2015, https://eprint.iacr.org/2013/879.pdf, 37 pages.
Ben-Sasson et al., "Zerocash: Decentralized Anonymous Payments from Bitcoin," 2014 IEEE Symposium on Security and Privacy, May 18, 2014, http://zerocash-project.org/media/pdf/zerocash-oakland2014.pdf, 16 pages.
Bitcoinstrings, "Blockchain in Words," retrieved from https://bitcoinstrings.com/blk00281.txt, Dec. 2013, 667 pages.
Bowe, "Pay-to-Sudoku," GitHub, retrieved from https://github.com/zcash-hackworks/pay-to-sudoku/blob/master/README.md, 2016, 2 pages.
Brown et al., "Transport layer security (tls) evidence extensions," Working Draft, IETF Secretariat, Internet-Draft drafthousley-evidence-extns-01, https://tools.ietf.org/pdf/draft-housley-evidence-extns-01, Nov. 2006 [retrieved May 2, 2018], 21 pages.
Buterin, "Quadratic Arithmetric Programs: from Zero to Hero," retrieved from https://medium.com/@VitalikButerin/quadratic-arithmetic-programs-from-zero-to-hero-f6d558cea649, Dec. 11, 2016, 9 pages.
Campanelli et al., "Zero-knowledge contingent payments revisited: Attacks and payments for services," Proceedings of the 2017 ACM SIGSAC Conference on Computer and Communications Security, Oct. 30, 2017, 28 pages.
Canetti et al., "Practical Delegation of Computation Using Multiple Servers," CCS, Oct. 17, 2011, 10 pages.
Castor, "Trust Your Oracle? Cornell Launches Tool for Confidential Blockchain Queries," CoinDesk, retrieved from https://www.coindesk.com/tech/2017/05/17/trust-your-oracle-cornell-launches-tool-for-confidential-blockchain-queries/, May 17, 2017, 5 pages.
Commercial Search Report dated Feb. 28, 2018, United Kingdom Patent Application No. 1719998.5, filed Nov. 30, 2017, 6 pages.
Costello et al., "Geppetto: versatile Verifiable Computation," 2015 IEEE Symposium on Security and Privacy, 2015, 22 pages.
Covaci et al., "NECTAR: Non-Interactive Smart Contract Protocol using Blockchain Technology," arXiv preprint arXiv:1803.04860, Mar. 13, 2018, 8 pages.
Davidsen et al., "Empowering the Economy of Things," 2017, 54 pages.

Eberhardt et al., "ZoKrates—Scalable Privacy-Preserving Off-Chain Computations," Information Systems Engineering (ISE), Aug. 2018, 8 pages.
Ethereum Foundation, "ZoKrates—A Toolbox for zkSNARKS on Ethereum," https://www.youtube.com/watch?v=sSIrywb5J_0, Nov. 26, 2017, 12 pages.
Fiore et al., Hash First, Argue Later Adaptive Verifiable Computations on Outsourced Data, ACM Computer and Communications Security, 2016, 40 pages.
Fournet et al., "A Certified Compiler for Verifiable Computing," HAL Open Science, Jun. 2016, 14 pages.
Franz et al., "CBMC-GC: An ANSI C Compiler for Secure Two-Party Computations," retrieved from https://arise.or.at/pubpdf/CBMC-GC_An_Ansi_C_Compiler_for_Secure_Two-Party_Computations.pdf, 2014, 5 pages.
Fuchsbauer et al., "Proofs on Encrypted Values in Bilinear Groups and an Applicaiton to Anonymity of Signatures," Third International Conference on Pairing-based Cryptography, Aug. 2009, 26 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
Hearn, "Continuing the zkSNARK Tutorials," retrieved from https://blog.plan99.net/vntinyram-7b9d5b299097, Dec. 15, 2016, 9 pages.
Hong et al., "Verifiable Computation of Large Polynomials," retrieved from http://or.nsfc.gov.cn/bitstream/00001903-5/154735/1/1000009080185.pdf, Dec. 16, 2014, 13 pages.
International Search Report and Written Opinion dated Jan. 15, 2019, Patent Application No. PCT/IB2018/058434, 11 pages.
International Search Report and Written Opinion dated Jan. 17, 2019, Patent Application No. PCT/IB2018/058432, 11 pages.
International Search Report and Written Opinion dated Jan. 17, 2019, Patent Application No. PCT/IB2018/058437, 10 pages.
International Search Report and Written Opinion dated Jan. 22, 2019, Patent Application No. PCT/IB2018/058583, 10 pages.
International Search Report and Written Opinion dated Jan. 23, 2019, Patent Application No. PCT/IB2018/058433, 12 pages.
International Search Report and Written Opinion dated Jan. 23, 2019, Patent Application No. PCT/IB2018/058491, 12 pages.
Jehan, "Rockchain Decentralized Audited Data Networks," White Paper, retrieved from https://www.rockchain.org/RockchainWhitePaper.pdf, Jan. 20, 2018, 28 pages.
Kerber, "Verifiable Computation in Smart Contracts," University of Edinburgh School of Informatics Computer Science 4th Year Project Report, published online Apr. 4, 2017 [retrieved May 2, 2018], https://git.drwx.org/bsc/proj-report/raw/branch/master/report.pdf, 49 pages.
Keutzer et al., "Anatomy of a Hardware Compiler," 1988, 10 pages.
Kiayias et al., "Proofs of Proofs of Work with Sublinear Complexity," Financial Cryptography and Data Security, 2016, 18 pages.
Kosba et al., "Hawk: The Blockchain Model of Cryptography and Privacy-Preserving Smart Contracts," IEEE Symposium on Security and Privacy, May 22, 2016, 31 pages.
Kreuter, "Techniques for Scalable Secure Computation Systems," retrieved from https://repository.library.northeastern.edu/files/neu:cj82rh04k/fulltext.pdf, May 2018, 145 pages.
Król et al., "SPOC: Secure Payments for Outsourced Computations," Jul. 17, 2018, 6 pages.
Kumaresan et al., "How to Use Bitcoin to Incentivize Correct Computations," retrieved from https://people.csail.mit.edu/ranjit/papers/incentives.pdf, Nov. 2014, 12 pages.
Kuzminov et al., "Bridging the Gaps with Iolite Blockchain," Iolite Foundation White Paper, 2017, 13 pages.
Malkhi et al., "Fairplay—A Secure Two-Party Computation System," Aug. 2004, 17 pages.
Mathworks, "Matlab Coder—Generate C and C++ Code From MATLAB Code," 9 pages.
Maxwell et al., "Chat logs," Bitcoin-wizards IRC Chat Channel, Aug. 16, 2013 [retrieved May 2, 2018], https://download.wpsoftware.net/bitcoin/wizards/2013/08/13-08-16.log, 1 page.
Maxwell et al., "CoinCovenants using SCIP signatures, an amusingly bad idea," Bitcoin Forum, Aug. 20, 2013 [retrieved Apr. 13, 2018], https://bitcointalk.org/index.php?topic=278122.0, 5 pages.

(56) References Cited

OTHER PUBLICATIONS

Maxwell et al., "Really Really ultimate blockchain compression: CoinWitness," Bitcoin Forum, Aug. 19, 2013 [retrieved Apr. 11, 2018], https://bitcointalk.org/index.php?topic=277389.0, 7 pages.

Maxwell, "The First Successful Zero-Knowledge Contingent Payment," Bitcoin Core, retrieved from https://bitcoincore.org/en/2016/02/26/zero-knowledge-contingent-payments-announcement/, Feb. 26, 2016, 5 pages.

Mayer, "zk-SNARK explained: Basic Principles," retrieved from https://www.researchgate.net/publication/321124635_zk-SNARK_explained_Basic_Principles, Dec. 2016, 9 pages.

Nakamoto, "Bitcoin: A Peer-to-Peer Electronic Cash System," Bitcoin, Oct. 31, 2008, https://bitcoin.org/bitcoin.pdf, 9 pages.

Ning, "Automatically Convert MATLAB Code to C Code," https://www.mathworks.com/videos/automatically-converting-matlab-code-to-c-code-96483.html, Aug. 19, 2014, 8 pages.

Parno et al., "Pinocchio: Nearly Practical Verifiable Computation," IEEE Symposium on Security and Privacy, May 19-22, 2013, 16 pages.

\* cited by examiner

SYSTEMS AND METHODS FOR ENSURING CORRECT EXECUTION OF COMPUTER PROGRAM USING A MEDIATOR COMPUTER SYSTEM

FIELD OF INVENTION

This invention relates generally to ensuring correct execution of computer programs in a distributed computing environment, and more particularly to a protocol for ensuring correct execution of a program wherein a first computing entity delegates execution of the program to a second computing entity. The invention is particularly suited, but not limited to, use in a blockchain network.

BACKGROUND OF INVENTION

In this document the term 'blockchain' may refer to any of several types of electronic, computer-based, distributed ledgers. These include consensus-based blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to as a useful application of the technology described in the present disclosure, for the purpose of convenience and illustration, Bitcoin is just one of many applications to which the technology described in the present disclosure may be applied. However, it should be noted that the invention is not limited to use with the Bitcoin blockchain; alternative blockchain implementations and protocols, including non-commercial applications, also fall within the scope of the present invention.

A blockchain is a peer-to-peer, electronic ledger which is implemented as a computer-based decentralised, distributed system made up of blocks which in turn may be made up of transactions and other information. In some examples, a "blockchain transaction" refers to an input message encoding a structured collection of field values comprising data and a set of conditions, where fulfilment of the set of conditions is prerequisite for the set of fields to be written to a blockchain data structure. For example, with Bitcoin each transaction is a data structure that encodes the transfer of control of a digital asset between participants in the blockchain system, and includes at least one input and at least one output. In some embodiments, a "digital asset" refers to binary data that is associated with a right to use. Examples of digital assets include Bitcoin, ether, and Litecoins. In some implementations, transferring control of a digital asset can be performed by reassociating at least a portion of a digital asset from a first entity to a second entity. Each block of the blockchain may contain a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (mining nodes) perform work to ensure that each transaction is valid, with invalid transactions rejected from the network. A node can have standards for validity different from other nodes. Because validity in the blockchain is consensus based, a transaction is considered valid if a majority of nodes agree that a transaction is valid. Software clients installed on the nodes perform this validation work on transactions referencing an unspent transaction output (UTXO) in part by executing the UTXO locking and unlocking scripts. If execution of the locking and unlocking scripts evaluate to TRUE and other validation conditions, if applicable, are met, the transaction is validated by the node. The validated transaction is propagated to other network nodes, whereupon a mining node can select to include the transaction in a blockchain. Thus, in order for a transaction to be written to the blockchain, it must be i) validated by the first node that receives the transaction—if the transaction is validated, the node relays it to the other nodes in the network; and ii) added to a new block built by a mining node; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc.) while being more versatile in their applications.

The present disclosure describes technical aspects of one or more blockchain-based computer programs. A blockchain-based computer program may be a machine readable and executable program recorded in a blockchain transaction. The blockchain-based computer program may comprise rules that can process inputs in order to produce results, which can then cause actions to be performed dependent upon those results. One area of current research is the use of blockchain-based computer programs for the implementation of "smart contracts". Unlike a traditional contract which would be written in natural language, smart contracts may be computer programs designed to automate the execution of the terms of a machine-readable contract or agreement.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced on the blockchain.

SUMMARY OF INVENTION

Thus, it is desirable to provide methods and systems that improve blockchain technology in one or more of these aspects. Such an improved solution has now been devised. Thus, in accordance with the present invention there is provided a method as defined in the appended claims.

In accordance with the invention there may be provided a computer-implemented method for a node of a blockchain network, the computer-implemented method comprising: encrypting a secret value under a public key associated with a mediator computer system; providing the encrypted secret value to a worker computer system, wherein the encrypted secret value is usable by the worker computer system and the mediator computer system to collectively execute a first program; causing a second program to be made available on a blockchain data structure, wherein execution of the second program has an input; determining the blockchain data structure reflects: a proof of correct execution of the second program; and an input value, wherein execution of the second program to generate the proof is based at least in part on using the input value as the input to the second program; and in response to determining the input value is valid, providing the secret value to the worker computer system, wherein the worker computer system is able to execute the first program using at least the secret value.

Preferably, the method may include: generating a cryptographic hash output based at least in part on the secret value; generating an attestation that the encrypted value and the cryptographic hash output are both determined based at least in part on the secret value; providing the cryptographic hash output and the attestation to the worker computer system, wherein the worker computer system is operable to use the attestation to determine whether the encrypted secret value and the cryptographic hash output are based at least in part on a same value.

The attestation may be a zero-knowledge proof and correctness of the zero-knowledge proof may be computationally verifiable by the worker computer system. Computational verification may involve the use of cryptographic operations to provide assurances of integrity and/or authenticity.

Preferably, the input value may be a first input value and the method may include, in response to determining the first input value is incorrect: calculating a second input value based at least in part on the first input value; providing the second input value to the worker computer system; and in response to determining that the worker computer system executed a third program using the second input value, providing the secret value to the worker computer system.

Preferably, calculating the second input value may include calculating a weighted Hamming distance.

Preferably, the method may comprise: obtaining a second attestation, the second attestation comprising a set of communications between the worker computer system and a data source, the set of communications usable to determine whether the input value is valid, wherein the second attestation is digitally signed by the data source; verifying authenticity of the second attestation using at least a public key associated with the data source; and determining whether the input is valid based at least in part on the set of communications.

In some cases, causing the second program to be made available on the blockchain data structure comprises causing a blockchain transaction to be mined to the blockchain data structure, wherein the blockchain transaction comprises information usable to determine the second program and a locking script. The locking script may encumber digital assets, wherein collectively executing the locking script and a corresponding locking script release the encumbrance on the digital assets, wherein collectively executing the locking script and corresponding unlocking script comprises verifying at least two digital signatures are of a set of digital signatures. The set of digital signatures may comprise of: a first digital signature associated with a computing entity performing the computer-implemented method described herein; a second digital signature associated with the worker computer system; and a third digital signature associated with the mediator computer system.

Verification of at least a majority of the signatures of the set of digital signatures may be performed as part of collectively executing the locking script and unlocking script to release the encumbrance.

Execution of the first program may transfer control of a digital asset to the worker computer system.

Preferably, the method may further include, in response to determining that the worker computer system failed to execute the third program using the second input value within a time threshold, causing a fourth program to be made available to the blockchain data structure, the fourth program usable to gain control of the digital asset.

The time threshold may encode the earliest time at which a blockchain transaction comprising a portion of the fourth program can be mined to the blockchain data structure.

Preferably, the method may include generating a digital signature and encoding the digital signature to an unlocking script. The unlocking script may further encode a purported digital signature associated with the worker computer system, wherein the fourth application comprises a locking script and the unlocking script and execution of the fourth program by one or more nodes of a blockchain network associated with the blockchain data structure comprises determining the digital signature and the purported digital signature are both valid.

The first application may comprise a locking script and unlocking script, wherein the unlocking script encodes a purported secret value and a purported digital signature associated with the worker computer system. The execution of the first application by one or more nodes of a blockchain network associated with the blockchain data structure may comprises determining that the purported secret value and the purported digital signature are both valid.

The locking script may comprise the cryptographic hash output. Determining the purported secret is valid may comprise computing an output of a cryptographic hash algorithm using the purported secret value and determining the output and the cryptographic hash output match.

It is also desirable to provide a system, comprising: a processor; and memory including executable instructions that, as a result of execution by the processor, causes the system to perform any of the methods as claimed.

It is also desirable to provide a non-transitory computer-readable storage medium having stored thereon executable instructions that, as a result of execution by one or more processors of a computer system, cause the computer system to at least perform any of the methods as claimed.

Additionally or alternatively, the invention may provide an improved blockchain programming tool or aid. It may provide an improved, efficient, and optimised arrangement that facilitates or enables distributed, verifiable computation.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

In various embodiments, systems and methods described herein are utilized to ensure the correct execution of computer programs in a distributed computing environment where multiple entities may control nodes of the distributed computing environment. In such a distributed environment, it may be difficult for a computing entity to delegate execution of a task to another entity at least because the two entities lack a trust relationship in which the delegating entity is provided assurances that the executing entity actually performed the task and performed the task correctly. A protocol in accordance with this disclosure may be utilized to provide cryptographically verifiable assurances of the correct execution of a program wherein a first computing entity delegates execution of the program to a second computing entity. Accordingly, the use of such a protocol may be utilized to improve the efficiency of a computing system (e.g., a distributed computing environment) by more efficiently utilizing available computing resources across the entire system to execute programs while also providing cryptographically verifiable assurances that the programs were executed correctly.

Figure 1:
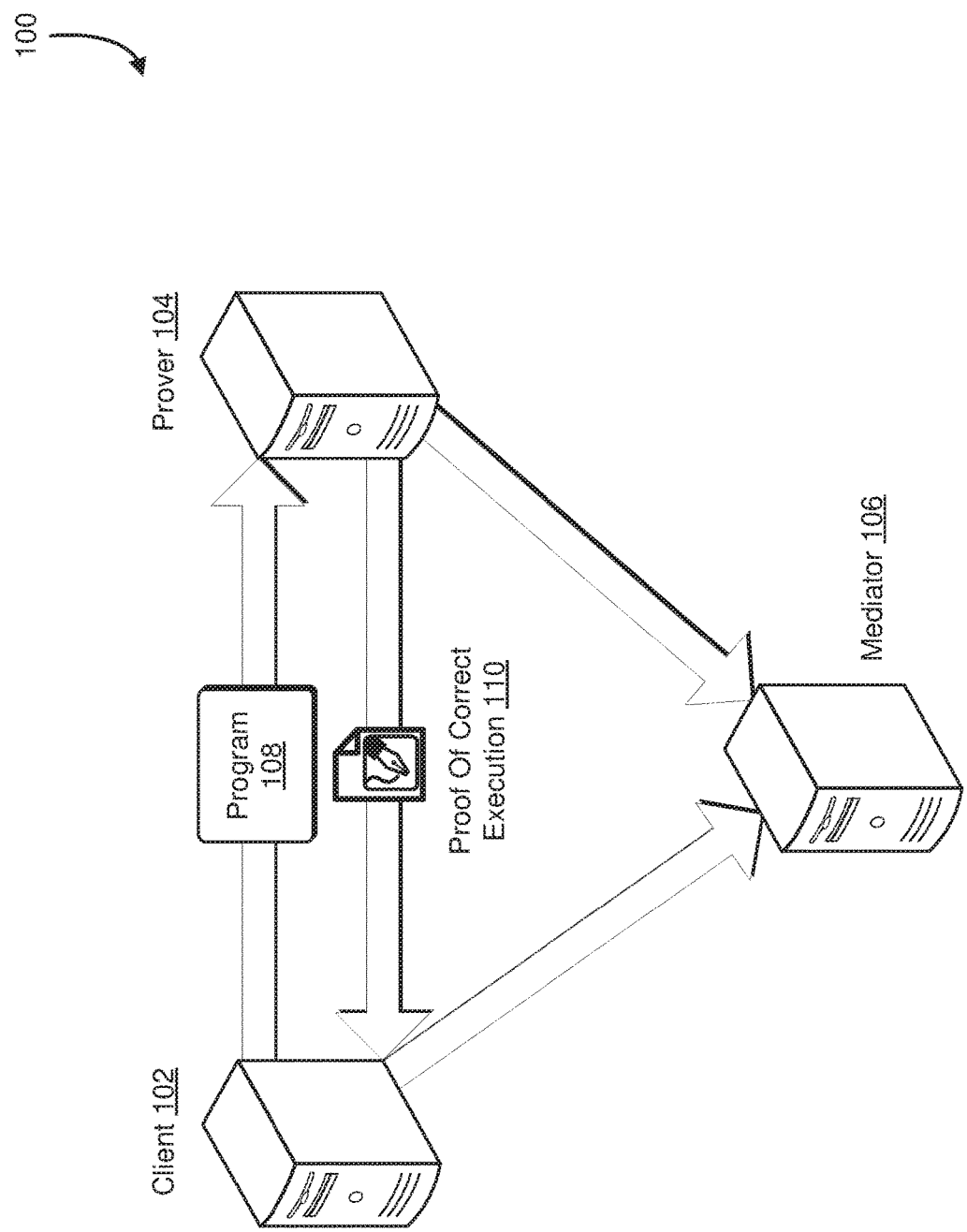
FIG. 1 illustrates an environment for verifying the correct execution of a program in accordance with at least one embodiment.

FIG. 1 illustrates an environment in which systems and methods described herein may be utilized to enforce and/or ensure the correct execution of a program. In some embodiments, a first computer system (e.g., a client 102) delegates execution of a program 108 to a second computer system (e.g., a prover 104). The prover 104 may execute the program and provide a proof of correct execution 110 to the client 102 that attests to the prover 104 having executed the program correctly (e.g., using the correct value for inputs, which may be received from an additional computer system). In some cases, a third computer system (e.g., a mediator 106) may be utilized to determine whether the prover correctly executed the program 108, according to a protocol. Techniques described herein may be practice in a distributed computing environment, and may be utilized in connection with a blockchain network.

A client 102 may refer to a computer system that delegates performance of a computational task to a prover 104, which may be a different computer system. The prover 104 may, generally speaking, be any suitable computer system that is able to perform computational tasks, which may be encoded in any suitable format, such as a program 108. The client 102 may select the prover 104 from among a plurality of computer systems that are capable of executing the program. The prover 104 may be a computer system that the client 102 does not have control over, and generally speaking, is not required to have a trust relationship with the client 102 and the client 102 does not, outside of the protocols described herein, require any additional assurances that the prover 104 will perform operations in a particular manner (e.g., executing the program according to a set of inputs specified by the client 102).

The program 108 may refer to a computational task and may be generated using techniques described in connection with FIG. 2. The program 108, may, for example, be a quadratic program $Q$ such as those described in connection with FIG. 2. Generally speaking, the program 108 may have one or more inputs that are used to determine, in connection with a set of instructions, one or more outputs. The input(s) and/or output(s) may be utilized to generate a proof of correct execution 110 that is an attestation generated by the prover 104 that is a computationally verifiable attestation that the input(s) and/or output(s) have the correct value. In an embodiment, the attestation is a zero-knowledge proof.

The mediator 106 may be a computer system that has and/or establishes a trust relationship with the client 102 and/or the prover 104. In this context, a trust relationship may refer to the mediator being determined by the client 102 and/or the prover 104 as being a suitable component to mediate disputes that may arise between the client 102 and the prover 104. For example, a trust relationship may imply a willingness to grant the mediator the ability to, in collaboration with either one of the client or the prover, to execute one or more correction programs.

In some embodiments, the protocol enables the execution and validation of programs through blockchain transactions. As described in more detail herein, a zero-knowledge protocol may have a set of phases including, but not limited to, a creation phase, a computation phase, and a verification phase. In the creation phase, the computation of public parameters usable for production and verification of the zero-knowledge proof is performed. In the execution phase, the program may be executed based on one or more inputs, and the one or more inputs may include data that is obtained from sources external to the blockchain such as trusted authorities, websites, and more. A prover may obtain data from an external data source as part of execution of the program. In the verification phase, the inputs may represent one or more of the parameters of a verification function that runs in accordance with a zero-knowledge proof verification. In some cases, it is desirable to have a protocol that ensures that the input used to execute the program is correct in other words, it may be desirable to constrain the prover to behave correctly and provide an accurate input when executing the program.

Figure 2:
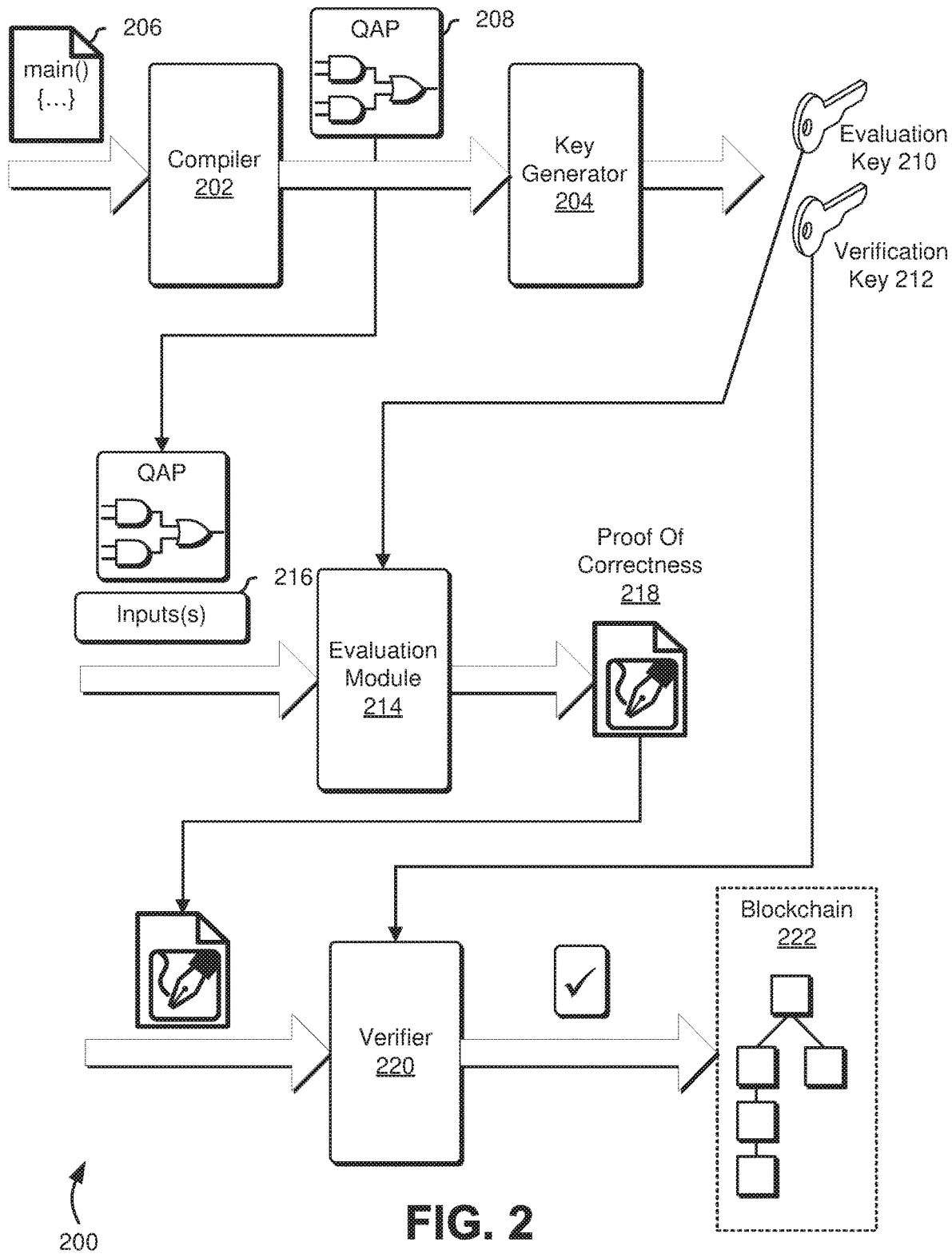
FIG. 2 illustrates a computing environment which may be utilized to implement a protocol in accordance with various embodiments.

FIG. 2 illustrates a computing environment 200 which may be utilized to implement a protocol in accordance with various embodiments. The protocol may be implemented using blockchain technologies to store proof-of-correctness and combine the "correct-by-construction" cryptography approach with smart contracts. In an embodiment, a public verifiable computation scheme comprises three phases: a setup phase, a computation phase and a verification phase.

A setup phase may be performed as part of a process to outsource the performance of computational tasks. A client, as referred to below, may refer to an entity such as a customer or client computer system that delegates performance of a computational task to a prover, which may be a different computer system. Clients may, generally speaking, delegate the performance of computational tasks for a variety of reasons, including but not limited to limited computing resources, lack of computing resources, financial costs associated with utilizing a client computer system to perform the task, energy costs associated with utilizing a client computer system to perform the task (e.g., a mobile device or laptop that relies on a battery for power may utilize a prover to perform computationally intensive tasks, thereby saving power and prolonging the usage of the battery-powered device), and more.

In an embodiment, the setup phase involves a client, customer, employee of an organization, or any other suitable entity writing contracts in a formal language with precise semantics. The contract may be written in a high-level programming language such as C or Java. Generally speaking, contracts may be expressed in any language or syntax that is or can be converted to a format that can be manipulated by a computer system. In an embodiment, a domain specific language, with a limited purpose, may provide type-safety and restricted expressivity may be utilized. The source code generated may be a precise description of a contract.

The compiler 202 may be any hardware, software, or a combination thereof that includes executable code that, if executed by one or more processors of a computer system, causes the system to take, as input, the source code 206 and produces a circuit. A compiler 202 may refer to a computer program that executes or performs instructions based on instructions that have been compiled into a machine-readable format such as binary code.

It should be noted that while a compiler 202 is illustrated, interpreters, assemblers, and other suitable software and/or hardware component may be utilized to convert the source code to a circuit. In an embodiment, the circuit is an arithmetic circuit that comprises wires that carry values from a field F and connect to logical and/or arithmetic gates. In an embodiment, the circuit $\mathcal{C}$ is used by the system to generate a quadratic program $Q$ 208 that comprises a set of polynomials that provide a complete description of the original circuit a $\mathcal{C}$.

In an embodiment, the compiler 202 is able to recognise a substantial subset of a programming language such as C or Java including but not limited to: pre-processor directives, static initializers, global and local functions, block-scoped variables, arrays, data structures, pointers, function calls, function operators (e.g., functors), conditionals and loops, and arithmetic and bitwise Boolean operators. In an embodiment, the compiler 202 does not support the entire set of commands in accordance with standards of the programming language (this may, in some cases, be intended to prevent certain types of algorithms from being executed in a smart contract, such as to prohibit recursive algorithms). In an embodiment, the compiler expands expressions of the source code into an arithmetic gate language to produce an arithmetic circuit. Circuit implementations have been contemplated in the past by Campanelli, M., et al. (2017) in "Zero-Knowledge Contingent Payments Revisited: Attacks and Payments for Services" and by Tillich, S. and Smart, B in "Circuits of Basic Functions Suitable For MPC and FHE." The arithmetic circuit may be utilized to build a Quadratic Arithmetic Problem (QAP) by the compiler 202 or any other suitable hardware, software, or combination thereof (e.g., a software module not illustrated in FIG. 2). The quadratic program is compiled into a set of cryptographic routines for the client (e.g., key generation and verification) and the prover (e.g., computation and proof generation) in accordance with an embodiment.

In an embodiment, the key generator 204 is hardware, software, or a combination thereof that includes executable code which, if executed by one or more processors of a computer system, causes the system to generate an evaluation key and a verification key form a quadratic program. Techniques for encoding computations as quadratic programs are contemplated in "Quadratic Span Programs and Succinct NIZKs without PCPs" by Gennaro, R., et al. (2013). In an embodiment, the quadratic arithmetic problem (QAP) $Q$ encodes the circuit $\mathcal{C}$ over a field F and contains a set of m+1 polynomials:

$$V=\{v_k(x)\}, W=\{w_k(x)\}, Y\{y_k(x)\}$$

with $0 \le k \le m$. A target polynomial t(x) is also defined. Given a function $f$ that takes n elements of F as input and outputs n' elements, with N=n+n', then $Q$ computes $f$ if $\{c_1, \ldots, c_N\} \in F^N$ is a valid assignment of the group of input and outputs off and if there exists a list of coefficients $\{c_{N+1}, \ldots, c_m\}$ such that t(x) divides p(x):

$$p(x) = \left(v_0(x) + \sum_{k=1}^{m} c_k \cdot v_k(x)\right) \cdot \left(w_0(x) + \sum_{k=1}^{m} c_k \cdot w_k(x)\right) - \left(y_0(x) + \sum_{k=1}^{m} c_k \cdot y_k(x)\right)$$

Therefore, in an embodiment, there must exist some polynomial x such that h(x)·t(x)=p(x). The size of $Q$ is m, and its degree is the degree of t(x).

In an embodiment, building a QAP for an arithmetic circuit comprises pick an arbitrary root $r_g \in F$ for each multiplication gate g in the circuit and defining the target polynomial to be $t(x)=\Pi_g (x-r_g)$. In an embodiment, an index $k \in \{1 \ldots m\}$ is associated to each input of the circuit and to each output from a multiplication gate. The polynomials in V encode the left input into each gate, the W encode the right input into each gate, and the Y encode the outputs. For instance, $v_k(r_g)=1$ if the k-th wire is a left input to gate g, and $v_k(r_g)=0$ otherwise. Therefore, for a particular gate g and its root $r_g$, the previous Equation can be simplified as follows:

$$(\Sigma_{k=1}^{m} c_k \cdot v_k(r_g)) \cdot (\Sigma_{k=1}^{m} c_k \cdot w_k(r_g)) = (\Sigma_{k \in I_{left}} c_k) \cdot (\Sigma_{k \in I_{right}} c_k) = c_g y_k(r_g) = c_g$$

The output value of the gate is equal to the product of its inputs. The divisibility check decomposes into deg(t(x)) separate checks, one for each gate g and root $r_g$ of t(x), such that $p(r_g)=0$. Addition gates and multiplication-by-constant gates do not contribute to the size or degree of the QAP.

In an embodiment, the QAP is defined over a field Fp, where p is a large prime. In an embodiment, it is desirable that QAP over Fp efficiently computes any function that can be expressed in terms of addition and multiplication modulo p. An arithmetic split gate may be designed to translate an arithmetic wire $a \in Fp$, known to be in $[0, 2^{k-1}]$, into k binary output wires. Accordingly, it follows that, Boolean functions can be expressed using arithmetic gates. For instance, NAND(a,b)=1−ab. Each embedded Boolean gate costs only one multiply. Moreover, new gates such as split can be defined as standalone and composed with other gates. Given input $a \in F_p$ known to be in $[0, 2^{k-1}]$, the split gate outputs k wires holding the binary digits $a_1, \ldots, a_k$ of a such $\Sigma^k 2^{i-1} a_i = a$ and each $a_i$ is either 0 or 1.

Finally, the public parameters to be used by all provers and verifiers are generated by the system as part of the setup phase. It should be noted that the evaluation key $E_K$ and the verification key $V_K$ are derived using a secret value selected by the client. A key generator 204 may utilize the quadratic arithmetic program (QAP) in connection with the key generation algorithm to generate the evaluation key $E_K$ 210 and the verification key $V_K$ 212.

In an embodiment, performing a computational task involves the computation of a function on an input 216 (i.e., a process for evaluating $f(x)$) by a prover. In an embodiment, the prover is any suitable computer system that the client may delegate a computational task to. The input 216, in an embodiment, includes information that attests to the prover's identity, such as a digital signature generated using a private key associated with the prover. In an embodiment, the prover is a computer system that the client agrees to transfer digital assets to in return for successfully completing a computational task. The client, in an embodiment provides an input x and the evaluation key EK to a prover, the prover uses the evaluation module 214 to a compute routine to compute the output y (i.e., $y=f(x)$ wherein the input is x and the function is f) and uses the evaluation key $E_K$ 210 to produce a proof-of-correctness 218. The evaluation module, in an embodiment, is hardware and/or software that includes instructions that, if executed by one or more processors of a computer system, cause the computer system to evaluate the values of the internal circuit wires of the QAP 208 and produce an output y of the QAP.

In an embodiment, each polynomial $v_k(x) \in F$ of the quadratic program is mapped to an element $g^{v_k(s)}$ in a bilinear group, where s is a secret value selected by the client, g is a generator of the group, and F is the field of discrete logarithms of g. In an embodiment, for a given input, the prover evaluates the circuit to obtain the output and the values of the internal circuit wires, which correspond to the coefficients $c_i$ of the quadratic program. Accordingly, a prover can evaluate $v(s)=\Sigma_{k \in \{m\}} c_k \cdot v_k(s)$ to get $g^{v(s)}$; compute w(s) and y(s); compute $h(x)=p(x)/t(x)=\Sigma^d h_i \cdot x^i$; and compute $g^{h(s)}$ using the $h_i$ and $g^{s(i)}$ terms in the evaluation key. In an embodiment, the proof-of-correctness 218 comprises ($g^{v(s)}$, $g^{w(s)}$, $g^{y(s)}$, $g^{h(s)}$) and a verifier uses the bilinear map to check that $p(s)=h(s) \cdot t(s)$. In an embodiment, the proof π is stored on the blockchain network 222 for later use or can be verified by multiple parties without requiring the prover to separately interact with each of these. In an embodiment, the evaluation of the circuit storage of the proof-of-correctness may be performed to unlock resources (e.g., digital assets) encumbered by a locking script of a transaction.

In the embodiment, the example blockchain network 222 illustrated in FIG. 2 comprises blockchain nodes that are implemented as peer-to-peer distributed electronic devices, each running an instance of software and/or hardware that performs operations that follow a blockchain protocol that is, at least in part, agreed to among operators of nodes. In some examples, "nodes" refers to peer-to-peer electronic devices that are distributed among the blockchain network. An example of a blockchain protocol is the Bitcoin protocol.

In an embodiment, at least some of the nodes are mining nodes that perform complex calculations, such as solving cryptographic problems. A mining node that solves the cryptographic problem creates a new block for the blockchain and broadcasts the new block to others of the nodes. The others of the nodes verify the work of the mining node and, upon verification, accept the block into the blockchain (e.g., by adding it to the distributed ledger of the blockchain). In some examples, a block is a group of transactions, often marked with a timestamp and a "fingerprint" (e.g., a hash) of the previous block. In this manner, each block may become linked to a previous block, thereby creating the "chain" that links the blocks in the blockchain. In embodiments, valid blocks are added to the blockchain by a consensus of the nodes. Also in some examples, a blockchain comprises a list of validated blocks.

In an embodiment, the proof w is broadcast to a blockchain network 222 and a verifier 220 is used to verify the proof. In an embodiment, the verifier 220 is any suitable computing entity, such as a node on a blockchain. It should further be noted that in some cases, the same computing entity that generates the evaluation key $E_K$ and verification key $V_K$ also verifies the proof. In an embodiment, nodes of blockchain can validate a transaction that transfers control of digital assets using the verification key $V_K$ and the proof π, thus validating the contract if the verification succeeds. One requirement of the protocol is that the prover cannot provide incorrect proofs, even when it knows the verification key $V_K$. Thus, in this protocol, a common reference string (CRS) is produced by the client or by a trusted third party who publishes at least the evaluation key $E_K$ and verification key $V_K$. In an embodiment, the published verification key $V_K$ can be used by any computing entity to verify computations.

Generally speaking, a client is able to use standard transactions (e.g., standard transactions as defined in a Bitcoin-based blockchain network) such as P2PK (pay-to-public-key) and P2PKH (pay-to-public-key-hash) to pay a counterparty or prover. For example, in an embodiment, a client converts a P2PK locking script into an arithmetic circuit and broadcasts a transaction that includes a puzzle derived from the circuit. A counterparty or prover receives the circuit, provides an appropriate input (e.g., information that attests to the prover's identity such as a shared secret between the client and the prover or a digital signature generated using the prover's private key) and runs the circuit to generate a proof-of-correctness i. In an embodiment, the proof is used to unlock digital assets, and furthermore, it may be the case that information identifying the counterparty or prover (e.g., a public key and/or digital signature associated with the counterparty or prover) is not recorded to the blockchain in an unobfuscated format.

In an embodiment, the verification key and the corresponding proof are generated according to techniques described above and/or below. Accordingly, a verifier is given verification key $V_K$ and proof π:

$$V_K = \begin{Bmatrix} \mathcal{P} \\ \mathcal{Q} \\ \alpha_v \mathcal{Q} \\ \alpha_w \mathcal{Q} \\ \alpha_w \mathcal{P} \\ \alpha_y \mathcal{Q} \\ \beta \mathcal{P} \\ \beta \mathcal{Q} \\ r_y t(s) \mathcal{P} \\ r_v v_i(s) \mathcal{P} \\ r_w w_i(s) \mathcal{Q} \\ r_y y_i(s) \mathcal{P} \end{Bmatrix}_{i=0 \ldots N}$$

-continued $$\text{Proof } \pi = \begin{Bmatrix} \sum_{i=N+1}^{m} a_i r_v v_i(s) \mathcal{P} \\ \sum_{i=N+1}^{m} a_i \alpha_v r_v v_i(s) \mathcal{P} \\ \sum_{i=N+1}^{m} a_i r_w w_i(s) \mathcal{Q} \\ \sum_{i=N+1}^{m} a_i \alpha_w r_w w_i(s) \mathcal{P} \\ \sum_{i=N+1}^{m} a_i r_y y_i(s) \mathcal{P} \\ \sum_{i=N+1}^{m} a_i \alpha_y r_y y_i(s) \mathcal{P} \\ \sum_{i=N+1}^{m} a_i (r_v \beta v_i(s) + r_w \beta w_i(s) + r_y \beta y_i(s)) \mathcal{P} \\ \sum_{i=0}^{d} h_i s^i \mathcal{Q} \end{Bmatrix}$$

such that the verifier computes a plurality of elliptic curve multiplications (e.g., one for each public input variable) and five pair checks, one of which includes an additional pairing multiplication.

Given verification key $V_K$, proof $\pi$, and $(a_1, a_2, \ldots, a_N)$, $t(x)$ verify that $t(x)$ divides $p(x)$ and hence $(x_{N+1}, \ldots, X_M) = f(x_0, \ldots, x_N)$, the verifier proceeds as follows. First it checks all the three a terms.

$$e(a_v r_v V_{mid}(s) \mathcal{P}, \mathcal{Q}) = e(r_v V_{mid}(s) \mathcal{P}, a_v \mathcal{Q})$$

$$e(a_w r_w W_{mid}(s) \mathcal{P}, \mathcal{Q}) = e(a_w \mathcal{P}, r_w W_{mid}(s) \mathcal{Q})$$

$$e(a_y r_y Y_{mid}(s) \mathcal{P}, \mathcal{Q}) = e(r_y Y_{mid}(s) \mathcal{P}, a_y \mathcal{Q})$$

wherein $V_{mid}(s) = \sum_{i=N+1}^{m} a_i v_i(s)$, $W_{mid}(S) = \sum_{i=N+1}^{m} a_i w_i(s)$, and $Y_{mid}(s) = \sum_{i=N+1}^{m} a_i y_i(s)$. Then, the verifier checks the term $\beta$:

$$e(r_v V_{mid}(s) \mathcal{P} + r_y Y_{mid}(s) \mathcal{P}, \beta \mathcal{Q}) \cdot e(\beta \mathcal{P}, r_w W_{mid}(s) \mathcal{Q}) = e(Z_{mid}(s) \mathcal{P}, \mathcal{Q})$$

and $Z_{mid}(s) = \sum_{i=N+1}^{m} a_i (r_v \beta v_i(s) + r_w \beta w_i(s) + r_y \beta y_i(s))$. Finally, the verifier checks the divisibility requirement:

$$e(r_v V(s) \mathcal{P}, r_w W(s) \mathcal{Q}) = e_y(r_y Y(s) \mathcal{P}, \mathcal{Q}) \cdot e(r_y t(s) \mathcal{P}, h(s) \mathcal{Q})$$

wherein $r_v V(s) \mathcal{P} = \sum_{i=0}^{m} r_v a_i v_i(s) \mathcal{P}$, $r_w W(s) \mathcal{Q} = \sum_{i=0}^{m} r_w a_i w(s) \mathcal{Q}$, $r_y Y(s) \mathcal{P} = \sum_{i=0}^{m} r_y a_i y(s) \mathcal{P}$, and $h(s) \mathcal{Q} = \sum_{i=0}^{d} h_i \mathcal{Q}$.

Thus, upon considering the notation from the sections described above and the examples described in this disclosure, the verification comprises a set of pair checks of the following elements, in accordance with one embodiment:

$$e(\pi_2, V_K^2) = e(\pi_1, V_K^3)$$

$$e(\pi_4, V_k^2) = e(V_K^5, \pi_3)$$

$$e(\pi_6, V_K^2) = e(\pi_5, V_K^6)$$

$$e((\pi_1 + \pi_6), V_K^2) = e(\pi_7, V_K^2)$$

$$e((a_0 V_K^{10} + a_1 V_K^{11} + a_2 V_K^{12} + a_3 V_K^{13} + a_4 V_K^{14} + \pi_2 + a_7 V_K^{15}), (a_0 V_K^{16} + a^1 V_K^{17} + a_2 V_K^{18} + a_3 V_K^{19} + a_4 V_K^{20} + \pi_4 + a_7 V_K^{211)}) = e((a_0 V_K^{22} + a_1 V_K^{23} + a_2 V_K^{24} + a_3 V_K^{25} + a_4 V_K^{26} + \pi_6 + a^7 V_K^{15}), V_K^2) * e(V_K^9, \pi_8)$$

Figure 3:
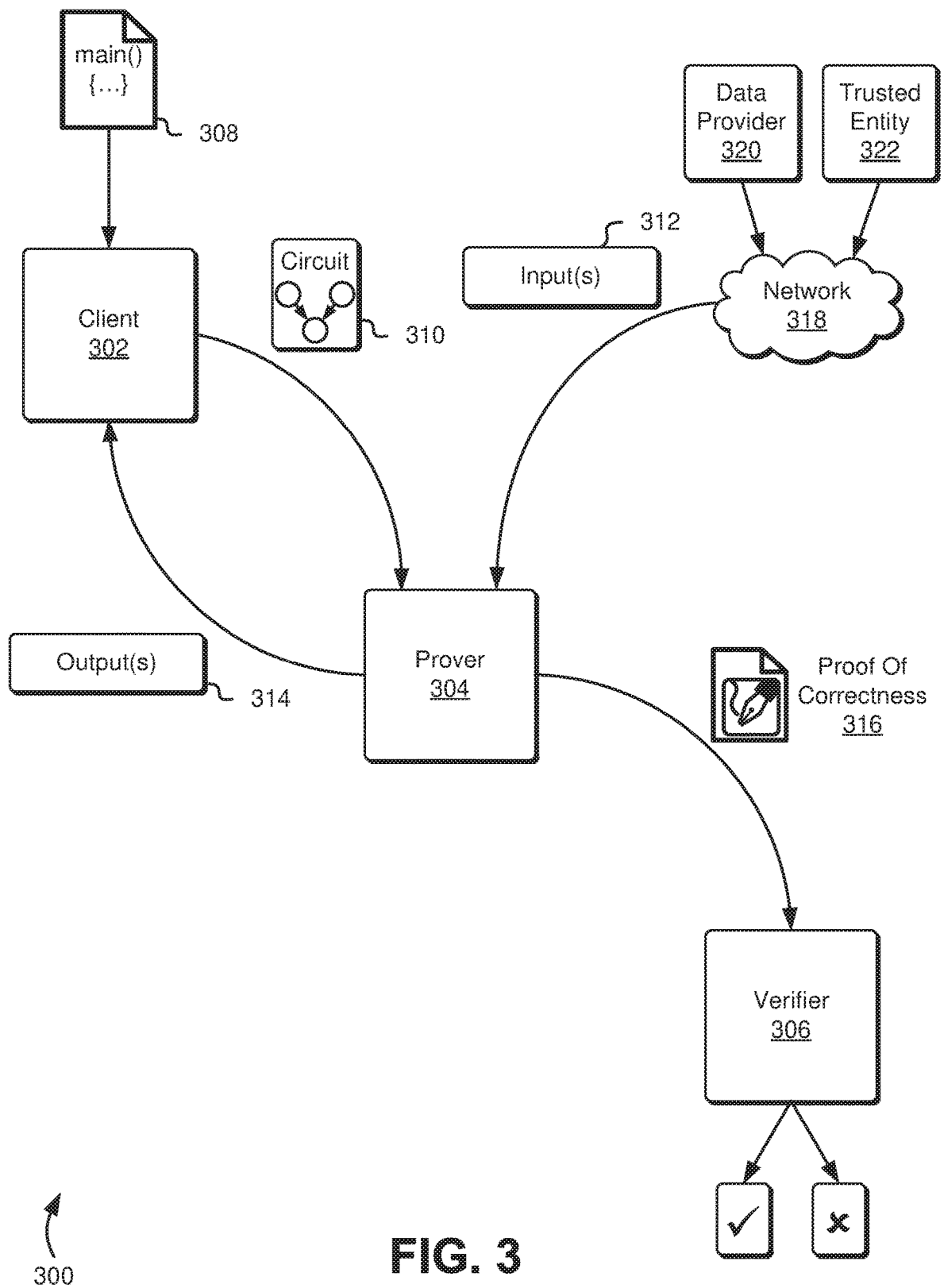
FIG. 3 illustrates a diagram of an environment suitable for performance of a verifiable computation.

FIG. 3 illustrates a diagram 300 for coordinating the performance of a verifiable computation. The client 302, prover 304, and verifier 306 may be nodes of a blockchain network. The client 302 may be any suitable computer system any may include executable code which, if executed by one or more processors of a computer system, causes the computer system to receive a smart contract 308. In an embodiment, the smart contract 308 is encoded in a high-level programming language as source code such as C, C++, or Java. In an embodiment, software such as a compiler, interpreter, and/or assembler may be utilized to transform the smart contract 308 to an arithmetic circuit 310 which consists of "wires" that carry values from a field $\mathbb{F}$ and connect to addition and multiplication gates. It $\mathbb{F}$ should be noted that the arithmetic circuit may refer to a logical circuit that can be implemented by a physical circuit comprising a series of physical gates (e.g., using transistor-transistor logic (TTL) integrated circuits such as 7400-series gates, flip-flops, buffers, decoders, multiplexers, and the like) connected by physical wires. While the execution of a smart contract 308 is described in the context of FIG. 3 and elsewhere, the use of a smart contract is merely one non-limiting example of source code that can be transformed to an arithmetic circuit. In an embodiment, a client 302 (e.g., alone or in conjunction with another entity) determines source code for performing a task defined by a set of operations, wherein execution of the task is delegated to a prover 304. Generally speaking, a verifier 306 may perform tasks associated with determining that the prover 304 executed the task correctly, such as by verifying the validity of a proof-of-correctness generated by the prover 304.

In an embodiment, the client 302 provides the prover 304 with an arithmetic circuit 310 and the prover 304 obtains an input 312 to the circuit. The source of the input data may be data that is stored on the blockchain, or may be obtained externally as a result of interaction with a certain data feed specified in the arithmetic circuit 310. The input data may be obtained from a data feed such as from a data provider 320 and/or trusted entity 322 via a network 318 such as a local network, an internal network, a public network such as the Internet, a wide-area network, a wireless network, a mobile network, a satellite network, a distributed computing system with a plurality of network nodes, and more. In some cases, the input 312 may be data such as data about the real-world state and events. The circuit 310 may be used to generate a quadratic program $Q$ that comprises a set of polynomials that provide a complete description of the original circuit. In either case, the prover 304 may executes the circuit $C$ or the quadratic program $Q$ on the input 312 to generate one or more outputs intermediate outputs and one final output. In some embodiments, the prover is expected to obtain, as the output, a valid transcript for $\{C, x, \psi\}$ that is an assignment of values to the circuit wires such that the values assigned to the input wires are those of x, the intermediate values correspond to the correct operation of each gate in $C$, and the values assigned to the output wire(s) is $\psi$; if the claimed output is incorrect (i.e., $\psi \neq \mathcal{P}(x)$), then a valid transcript for $\{C, x, \psi\}$ does not exist. In an embodiment, the prover is expected to provide a subset of the values of the circuit wires, wherein the selected subset of the values of the circuit wires are not known to the prover a priori.

In an embodiment, a prover 304 obtains external data from a data provider 320 in the following manner: the prover 304 and data provider 320 establish a cryptographically protected communications session; the prover 304 makes a request via the cryptographically protected communications session; the data provider provides data in response to the request; the prover receives the data, and in response to receiving the data, requests an attestation of the communications between the parties; the data provider computes a cryptographically verifiable proof-of-communications $\pi_{communications}$ between the prover and the data provider during the cryptographically protected communications session, and digitally signs the attestation with the data provider's private key; and the prover receives the proof-of-communications. Generally speaking, the proof-of-communications is a cryptographically verifiable attestation that one or more communications occurred between a client and server (e.g., between the prover 304 and data provider 320). In an embodiment, the attestation can be used to verify the contents of the communications between the client and server, although it should be noted that in some cases, a portion of the communications may be redacted (e.g., information whose disclosure is subject to legal restrictions), such as by replacing the redacted information with an obfuscation of the information (e.g., the information in an encrypted or hashed format) or replaced with a predetermined default value. In an embodiment, the attestation is determined based at least in part on a root value of a Merkle tree. In an embodiment, the attestation (e.g., the proof-of-communications) is digitally signed using a cryptographic private key accessible to the data provider 320. An entity such as a certificate authority may issue a digital certificate that certifies a cryptographic public key corresponds to the private key. It should be noted that in the scope of this disclosure, a proof-of-communications is generally referred to using the notation $\pi_{communications}$ whereas a proof of correct execution may be referred to as $\pi_{Prover}$ or, more simply. Techniques for obtaining data from the data provider 320 and/or verifying the integrity and/or authenticity of data obtained from the data provider 320 may be performed in accordance with techniques described in U.K. Patent Application No. 1720946.1.

In an embodiment, a trusted entity 322 or trusted authority may be an entity such as a computing system that is expected to have access to the input data (e.g., at the present or in the future). The public key of the data feed can be embedded in a locking script constraining the signature and the message in the unlocking script to have a mathematical relationship with the key rather than a fixed value. In this way, the lock is configured such that any modification of the data will be detected and corrective action may be taken, such as a mitigation and/or invalidation. Undetermined data may be used to lock digital assets and may be data that is not yet known to the locking node at the time when a locking script is configured. This data may be data that is not yet established (such as data that is expected to be created in the future but is not yet created) or data that is known to another node but not yet available to the locking node. The data is, however, data that is expected to be available (at present or in the future) from the trusted entity 322. The locking script may include a public key for a determined data source (e.g., the trusted entity 322) and including instructions to cause a validating node executing the locking script to verify the source of the data provided in an unlocking script by: a) generating a modified public key based on the public key for the determined data source and based on data defined in the unlocking script; and b) evaluating a signature in the unlocking script based on the modified public key. Techniques for utilizing the trusted entity 322 in accordance with various techniques described herein may be in accordance with those described in connection with U.K. Patent Application No. 1705749.8.

In embodiments, the output $\psi$, the values of the internal circuit wires (or a subset thereof), and the evaluation key $E_K$ are used to produce the proof-of-correctness 316. The proof $\pi$ can be stored on the blockchain and verified by multiple parties without requiring the prover 304 to separately interact with the multiple parties. In this manner, a verifier 306 can validate the broadcasted transaction using the public verification key $V_K$ and the proof, thereby validating the contract. In some cases, the client 302 may reclaim digital assets encumbered by the broadcasted transaction if the verification fails. In some cases, the verifier 306 and the client 302 are the same computer system.

Figure 4:
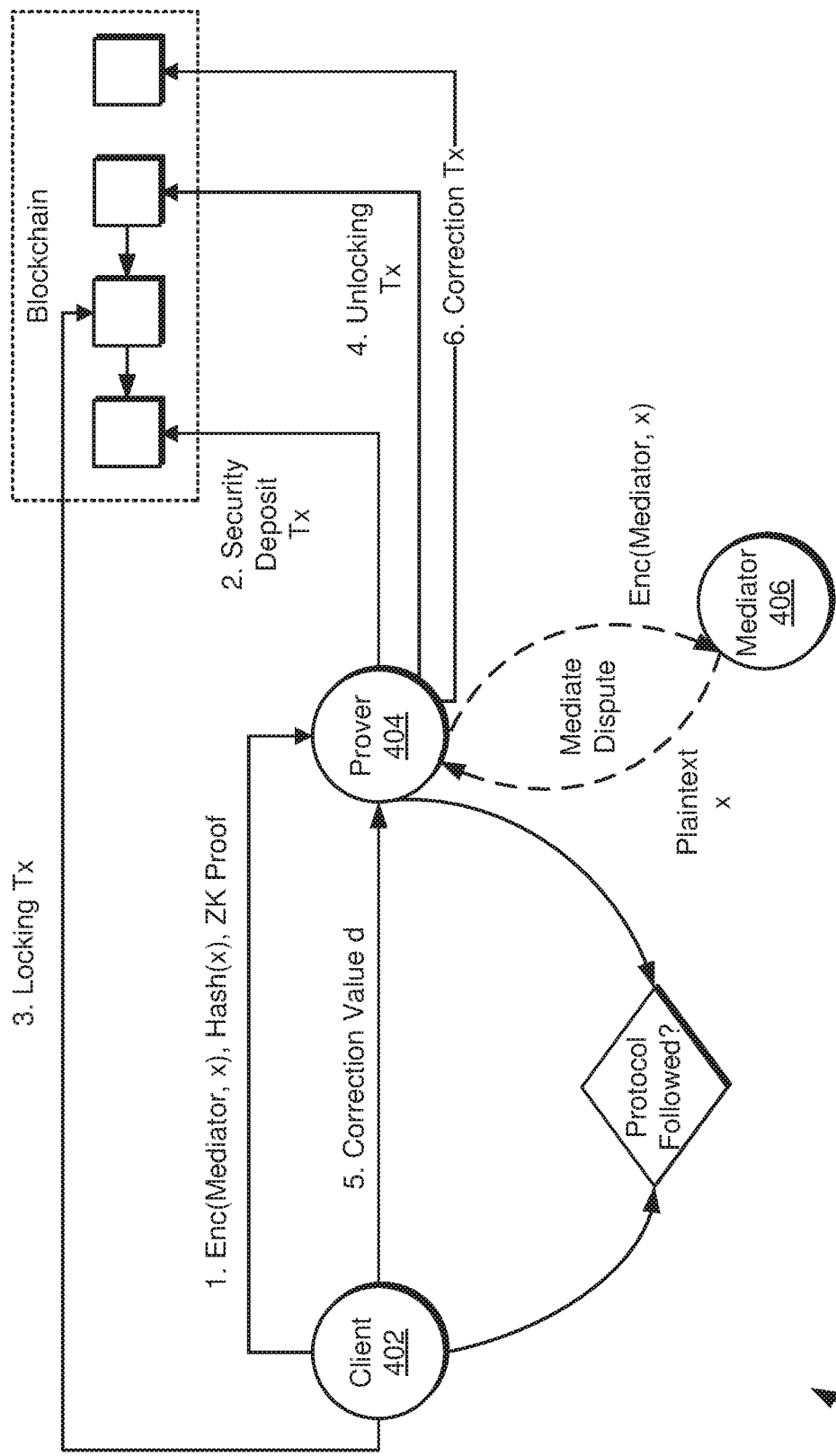
FIG. 4 illustrates a diagram of an environment in which a protocol may be implemented to enforce correct execution of a program in a distributed computing environment.

In an embodiment, FIG. 4 illustrates a diagram 400 of a protocol for securing execution of the program wherein input data of a program (e.g., a smart contract) is validated. In an embodiment, the protocol provides for automatic compensation of potential damage caused by the incorrect execution of the program. The client 402, prover 404, and mediator 406 may be in accordance with those described elsewhere in this disclosure.

As discussed elsewhere, a client, such as the client 402 illustrated in FIG. 4 may refer to a computer system controlled by an entity wherein the client computer system and/or the client entity is a party to a contract. For example, the client 402 may be associated with an entity that places an order to buy a token in exchange for digital assets such as Bitcoins which are transferred to the issuer or owner of the token. The token may be a smart contract.

The prover 404, may, as described elsewhere, be a computer system that monitors a network to find transactions that embed or reference programs such as smart contracts. For example, the prover 404 may be a node of a blockchain network. A prover may also be referred to as a worker or worker computer system.

A mediator 406 may be a mediator computer system that has and/or establishes a trust relationship with the client 402 and/or the prover 404. In this context, a trust relationship may refer to the mediator being determined by the client 402 and/or the prover 404 as being a suitable component to mediate disputes that may arise between the client 402 and the prover 404. For example, a trust relationship may imply a willingness to grant the mediator the ability to, in collaboration with either one of the client or the prover, to unlock digital assets associated with execution of a smart contract. For example, the mediator may be used to provide automatic compensation of a possible damage arising from the incorrect execution of a program (e.g., smart contract).

The client 402 may determine a secret value, which may be randomly or pseudo-randomly generated. The secret value may refer to a value that should not be provided to the prover 404 in plaintext until the client 402 determines that it is acceptable for a security deposit posted by the prover 404 to be returned. It should be noted that in some cases, the security deposit functions as an incentive to for the prover 404 to follow the protocol for correct execution of the program the prover 404 risks losing control of assets encumbered by a security deposit transaction if the protocol is not followed. Accordingly, it may be the case that the client 402 reveals the secret value to the prover 404 in response to the client 402 determining that the prover 404 has fulfilled all of the prover's responsibilities in accordance with the protocol.

After determining the secret value, the client 402 may encrypt the secret value, thereby generating an encrypted secret. The secret value may be encrypted using a public key associated with the mediator 406 to generate a ciphertext. In an embodiment, the mediator 406 is jointly selected by the client 402 and the prover 404. In an embodiment, the mediator 406 is a node of the blockchain network described in connection with FIG. 1. In an embodiment, the secret value is encrypted under a symmetric key known both the client 402 and the mediator 406. The client 402 may also generate compute a hash output using the secret value as an input to a cryptographic hash algorithm such as a SHA-256 cryptographic hash algorithm. Additionally, the client 402 may generate an attestation that the ciphertext and the hash output both encode the same secret value. In an embodiment, the attestation is a zero-knowledge proof. The client 402 may transmit the ciphertext, the hash output, and the attestation to the prover 404 as part of the protocol.

The prover 404 may post a security deposit transaction to a blockchain network, wherein the security deposit transaction encumbers digital assets of the prover 404 and is used to ensure that the prover 404 behaves in accordance to the protocol. If the prover 404 does not follow the protocol, the prover 404 risks forfeiting the assets encumbered by the security deposit transaction. In an embodiment, the security deposit transaction is created by the prover 404 and redeems a previous transaction of a value D bitcoins and can be redeemed in two ways: first, by publishing the secret value and the digital signature of the prover 404 (referred to as a recover deposit transaction); or second, by the production of digital signatures on the same transaction (referred to as a compensation transaction) by both the client 402 and the prover 404. The security deposit transaction may reference a previous transaction with an UTXO of D bitcoins (or other suitable digital assets) that belong to the prover 404. The security deposit transaction may comprise one or more inputs such as a digital signature of the prover 404. The type and/or amount of digital assets encumbered by the security transaction may be mutually agreed upon by the client 402 and the prover 404 or may be specified by the client 402, and may be selected based at least in part on the maximum damage that can be caused by the execution of the program (e.g., smart contract) using incorrect input data.

In an embodiment, the client 402 and a counterparty agree on the terms to the execution of a program (e.g., a smart contract). The counterparty may create locking transaction wherein one of the outputs is locked by the program (e.g., a smart contract script) and sends it to the client 402. The counterparty may be referred to as an issuer of a program (e.g., smart contract). It should be noted that at this point, the locking transaction is not yet valid because the value of the inputs is not equal to the value of the outputs of the locking transaction. Once the client 402 receives the locking transaction, the client 402 adds an input to the locking transaction and unlocks a UTXO controlled by the client 402 to transfer to the issuer agreed upon digital assets and also a fee that is to be paid to the prover 404 for execution of the program (e.g., smart contract) and an output that has a value of the fee to the prover 404 and a multi-signature unlocking script that releases the encumbrance on the fee when two of the following three signatures are provided: a signature from the client 402; a signature from the prover 404; and a signature from the mediator 406. The client 402 may broadcast the locking transaction to the blockchain network in response to detecting that the prover 404 posted the security deposit transaction.

The prover 404 may gather external data and compute a zero-knowledge proof necessary for the contract execution. Techniques for gathering external data may include notarizing communications with a data source. An approach to notarizing communications has been contemplated by Hajjeh and M. Badra in "TLS Sign" which defines a new sub-protocol called TLSSignOnOff where the client (which may be a different entity from the client described in the context of the zero-knowledge protocol) and the server notify a peer when they start or stop transmitting signed data. After a stop message, the server gathers a hash of the conversation and signs it. Various other approaches for notarizing record data (e.g., saving records of a session and signing the conversation with a cryptographically verifiable proof of the authenticity and/or integrity of the recorded conversation) of a cryptographically protected communications session can be used, such as techniques described by "R. Housley and M. Brown, "Transport Layer Security (TLS) Evidence Extensions" and by H. Ritzdorf, K. Wust, A. Gervais, G. Felley, and S. Capkun, "TLS-N: Non-repudiation over TLS Enabling Ubiquitous Content Signing for Disintermediation" which define an evidence window that starts when the client makes a request and when one of the parties closes the evidence window, a hash of the messages and the timestamps of the generation of the evidence are signed by the server, optionally with sensitive records being hidden. Techniques for gathering external data may also in accordance with those described in Gathering external data may also utilize a trusted data source in connection with U.K. Patent Application No. 1705749.8. The prover 404 may broadcast the unlocking transaction to the blockchain network.

After the prover 404 broadcasts the unlocking transaction, a verifier computer system may perform a verification process to determine whether the proof of correct execution is valid. In some embodiments, the verifier is a computing entity that is different from the client 402 but such need not—the client may perform the verification process. In an embodiment, the verification process both comprises verifying the validity of the proof of correct execution (e.g., that the output was generated from the circuit based at least in part on one or more inputs to the circuit) and also verifying that the data input by the prover 404 to the circuit was the correct input. For example, the verification may include checking whether the value of an input to a program is an expected value based on a notarized conversation from a trusted data source that provides external data (e.g., flight information for which a party is insured against delays; weather data for financial derivatives contracts using a data feed of the weather instead of the price index for crop insurance).

If the client 402 (or, more generally, any suitable system for performing the verification process) determines that the input data is not correct, the prover 404 may compute a damage d that reflect the difference between a first output generated based on a correct input value and a second output generated based on the incorrect input value that was broadcast by the prover 404 in the unlocking transaction. For example, a smart contract (e.g., a program) may insure a party against delays of a particular flight, and execution of the program may include determining whether the particular flight was delayed using external data such as flight information of a particular commercial flight on a particular day. If the flight was delayed, a party of the program may receive a transfer of assets (e.g., a smart contract that provides travel insurance against delays). Various extensions, modifications, and alternative embodiments are also contemplated herein for example, transfer of assets may be based at least in part on additional criteria, such as the delay being for a particular reason (e.g., weather-related delays/cancellations), a requirement that the delay be at least a certain duration (e.g., only delays of over 3 hours are insured), and varying transfers depending on the duration of the delay (e.g., longer delays are insured for greater amounts). As a second example, in the case where the input to the program corresponds to an exchange rate between currencies, the damage d may measure the difference in the amount that the client 402 should receive based on the correct currency exchange rate (e.g., based on the rate encoded in a notarized communication session by a trusted source) and the currency exchange rate that the prover 404 used to execute the program. In an embodiment, the prover 404 delegates computation of the damage d to another computer system, such as another worker different from the prover 404 illustrated in FIG. 4. It should be noted that in some cases, the system may also request computation of the damage by the prover 404. In an embodiment, a zero-knowledge proof of the damage amount may be generated to provide an attestation of the damage amount, which may correspond to the output of a different circuit (e.g., program).

Once the system (e.g., the client 402) calculates or otherwise determines (e.g., by receiving the result of the calculation from another prover) the value of the damage, the system may cause the calculated damage to made available to the prover 404. In an embodiment, the calculated damage value and a zero-knowledge proof attesting to the validity of the damage value is made available to the prover 404 by broadcasting the damage value and/or the proof to a blockchain network, which may enable other nodes of the blockchain to determine whether the damage value is correct. In an embodiment, the damage value and/or the proof is made available to the prover 404 outside of the blockchain for example, the system may transmit a message to the prover 404 in any suitable manner, the message comprising the damage value and/or the proof. In some embodiments, the system provides the damage to the prover 404 if and only if the damage value is non-zero.

In some embodiments, the prover 404 receives or otherwise obtains a damage value. If the damage value is zero, the prover 404 may proceed in the same or similar manner as if a damage value was not received. For example, the prover 404 may receive a message indicating the damage associated with the execution of a particular program (e.g., smart contract) is zero, and determine that a compensation routine does not need to be executed. In an embodiment, the prover 404 waits for the client 402 to provide the secret value. The secret value may be usable to redeem digital assets encumbered by a blockchain transaction for example, the blockchain transaction may include a locking script and unlocking script that, when collectively executed, verifies that the correct secret value was provided in the unlocking script and releases an encumbrance on the digital assets.

However, if the prover 404 receives a damage value that is non-zero, the prover 404 may perform one or more operations in accordance with a protocol. In an embodiment, the prover 404 receives a damage value and a corresponding zero-knowledge proof about the damage value. The prover 404 may verify the proof. If the proof is verified, the prover 404 may make a determination as to whether or not the prover 404 agrees with the value of the received damage value. In an embodiment, the prover 404 performs any suitable set of operations to determine a damage value, such as by executing a program to calculate damage, delegating execution of the program to another computing entity (e.g., the prover 404 thereby becomes a client for the execution of the program by a different prover).

If the damage value determined by the prover 404 matches the damage value provided to the prover 404, the prover 404 may determine that the damage value is correct and execute one or more steps that cause transfer of control of assets equal to the damage value d to the client 402 as compensation. In an embodiment, the prover 404 broadcasts a transaction to the blockchain network that includes the transfer of control of assets equal to the damage value d to an address associated with the client 402. However, if the prover 404 determines a different value for the damage (or the zero-knowledge proof does not verify), the prover 404 may provide to the mediator 406 a timestamped transcript of the conversation. The mediator may utilize the transcript to determine whether the damage value calculated by the client 402 or prover 404 is correct.

The prover 404 may receive the secret value at various times and from various entities. For example, the secret value may be provided by the client 402 to the prover 404 upon verification of the proof of correct work that the prover 404 correctly executed a program (e.g., smart contract) and that one or more inputs used to generate the output of the program matches an expected value based on data that is external to a blockchain (e.g., data whose correctness and/or value is not computationally verifiable using only data stored on the blockchain network). The client 402 may provide the secret value to the prover 404 upon calculating a damage value d and receiving a transfer of digital assets as compensation from the prover 404 of that amount. The prover 404 may receive the secret value from the mediator 406 in response to the mediator determining that the damage value d that the client 402 provided to the prover 404 is incorrect, that the prover 404 provided a different damage value d' that is the correct damage value, that the transfer of digital assets equal to the damage value d' was made to the client 402, and combinations thereof.

Upon receiving the secret value, the prover 404 may generate a blockchain transaction to recover digital assets encumbered in a security deposit. The prover 404 may generate a blockchain transaction comprising an unlocking script that encodes the secret value and a digital signature of the prover 404. A corresponding locking script that encumbers the digital assets may include instructions that verify that the unlocking script encodes the correct secret value by comparing a hash of the secret value with an output value encoded in the locking script and also verify the digital signature of the locking script using a public key associated with the prover 404. Accordingly, the locking script and unlocking script may collectively form a program that, if executed, transfers control of digital assets encumbered by the locking script of the security deposit transaction. In some embodiments, the blockchain transaction to recover digital assets may be time restricted such that recover deposit transaction must be broadcast (e.g., mined) to the blockchain network within the time duration $t_w$. In an embodiment, this restriction is encoded in the locking script. In some embodiments, the restriction is not encoded programmatically, but is enforced by allowing a different transaction (e.g., a compensation transaction) to claim the digital assets encumbered by the security deposit transaction on behalf of the client 402 after time $t_w$.

For example, in an embodiment, the client 402 determines that the input value used by the prover 404 to execute a program (e.g., smart contract) is not the expected input value based on information obtained from a trusted source (e.g., via a notarized communications session) and sends the prover 404 a message indicating a calculated damage value d. If the prover 404 does not transfer digital assets correspond to a compensation value of at least d, the client 402 may wait until time $t_w$ to post a blockchain transaction to claim the digital assets of the security deposit. The compensation transaction may encode a digital signature of both the client 402 and prover 404 and may be time locked such that the compensation transaction cannot be mined to the blockchain network prior to a time $t_w$. The compensation transaction may include an unlocking script that allows the client 402 to control digital assets encumbered by the security deposit transaction. In an embodiment, the body of the compensation transaction is signed by the prover at the start of the communication, which may be at or before the start of the protocol.

Figure 5:
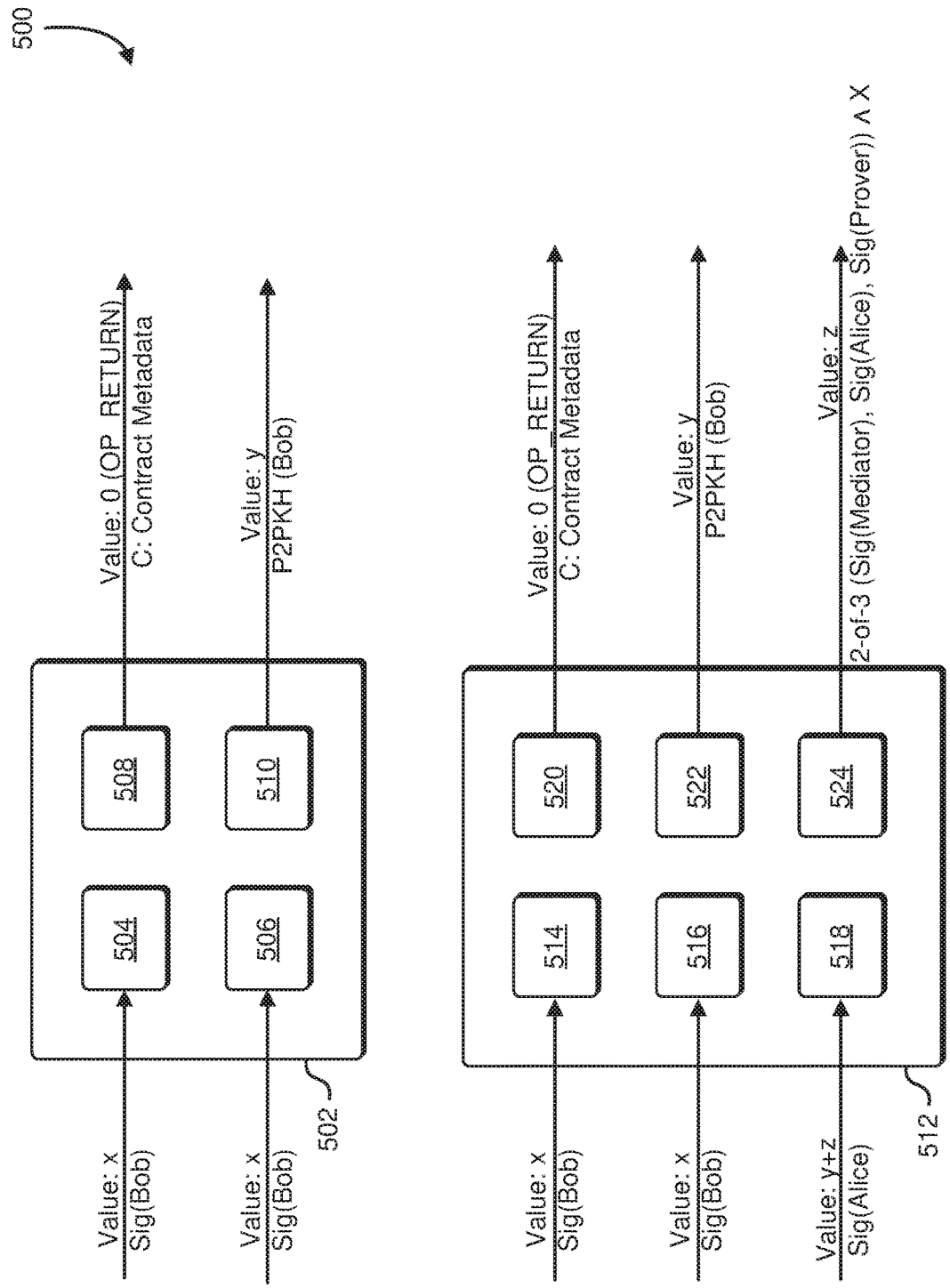
FIG. 5 illustrates an example of a transaction record in accordance with a blockchain-based protocol for enforcing correct execution of a program in a distributed computing environment.

FIG. 5 illustrates an example of a transaction record generated by a first client computer system operated by Bob and a second client computer system operated by Alice. Bob may be referred to as an issuer of a token and Alice may be referred to as a client. The diagram 500 illustrates the creation of a locking transaction for execution of a program (e.g., smart contract). The locking transaction 502 may direct a transfer of digital assets to a cryptocurrency wallet or address that is accessible by Bob in exchange for a smart contract. In the example shown, Alice utilizes a pay-to-public-key-hash by specifying a hash of a public key that is associated with a private key controlled by Bob. In other examples, Alice may utilize a pay-to-public-key or pay-to-script-hash opcode to transfer digital assets to Bob. Using the first client computer system, Bob prepares a locking transaction 502 for the contract offered, with two inputs and two outputs. In the example as shown, Bob generates a first input 504 having a value of x, which may have a value of a few Satoshis and a first output 508 that includes metadata that describes the terms of the contract. The first output 508 may have a value of zero (OP_RETURN). In the example shown, Bob generates a second input 506 also having a value x or a few Satoshis and a second output 510 having a value of y that indicates the digital assets Alice must transfer, and pay-to-public-key-hash ("P2PKH"). The locking transaction 502 may be transmitted from the first client computer system operated by Bob to the second client computer system operated by Alice.

In an embodiment, at least some of the nodes operate as validating nodes that validate transactions as described in the present disclosure. In some examples, a transaction includes data that provides proof of ownership of a digital asset (e.g., a number of Bitcoins) and conditions for accepting or transferring ownership/control of the digital asset. In some examples, an "unlocking transaction" refers to a blockchain transaction that reassociates (e.g., transferring ownership or control) at least a portion of a digital asset, indicated by an unspent transaction output (UTXO) of a previous transaction, to an entity associated with a blockchain address. In some examples, a "previous transaction" refers to a blockchain transaction that contains the UTXO being referenced by the unlocking transaction. In some embodiments, the transaction includes a "locking script" that encumbers the transaction with conditions that must be fulfilled before ownership/control can be transferred ("unlocked").

The locking transaction 502 is modified by Alice using the second client computer system. In the example shown in FIG. 5, the resulting modified locking transaction 512 includes three inputs and outputs. The first input 514 is unchanged and includes a value of x (a few Satoshis). The first output 520 is unchanged and retains the metadata that describes the terms of the contract. The second input 516 is unchanged and has a value of x (a few Satoshis). As with the locking transaction 502, the second output 522 retains a value of y (corresponding to the digital assets Alice must transfer control of), and P2PKH. Using the second client computer system, Alice adds a third input 518 and a third output 524. The third input 518 has a value of y+z that corresponds to digital assets that Alice transfer control of for the contract, and a fee for the worker. The third output 524 has a value of a z that corresponds to the fee for the worker. A multi-party signature feature may be utilized in a scheme where a client sends the resources (e.g., digital assets) for the contract execution to a 2-of-3 multisig address with one key controlled by each of the transacting parties (e.g., the client and the prover) and one controlled by the mediator. To do so, the client (e.g., Alice) creates a multisig address for the private keys of the client, prover, and mediator. In an embodiment, the locking transaction is timelocked, allowing Alice to recover her resources (e.g., digital assets after a time window $t_w$.

The mediator may be a mediator computer system as described above in connection with FIG. 4. If there is a dispute (e.g., Alice does not agree with the input value used by the prover in execution of a program), the mediator may collaborate with either the client or the prover as appropriate to redeem the funds for example, if the client does not follow an established protocol, the mediator may collaborate with the prover to cooperate in causing the transfer of digital assets encumbered under the third output (e.g., the fee value z) to the prover. Conversely, if the prover does not follow the protocol, the mediator may collaborate with the client, as two out of the three signatures are sufficient to redeem the escrowed funds. It should be noted that for added privacy, rather than including a longstanding address that is publicly associated with the mediator, the parties can use a blinded address. In order to convince the mediator about the correctness of data, parties may present a transcript that comprises a proof of communications. In some cases, a blinded address for the mediator is used and makes the scheme internally hiding however, if a goal of the protocol is to provide transparency (e.g., allow nodes of a blockchain network to verify the transaction) then non-blinded addresses may be utilized in an embodiment.

In some cases, the protocol is secure, which may refer to inability of the mediator to unilaterally redeem escrowed funds. In some cases, the protocol is optimistic, which may refer to an assumption that the mediator will voluntarily mediate a dispute. In some embodiments, the protocol requires the mediator to supply a fourth input having a value M corresponding to a deposit alongside the transacting parties, and the mediator is able to recover the deposit value M if and only if the escrow transaction encumbering the worker fee is redeemed. In this way, the likelihood that the mediator causes a denial-of-service attack by refusing to mediate disputes is mitigated because the mediator is unable to reclaim the deposit value until after the worker fee is redeemed.

Figure 6:
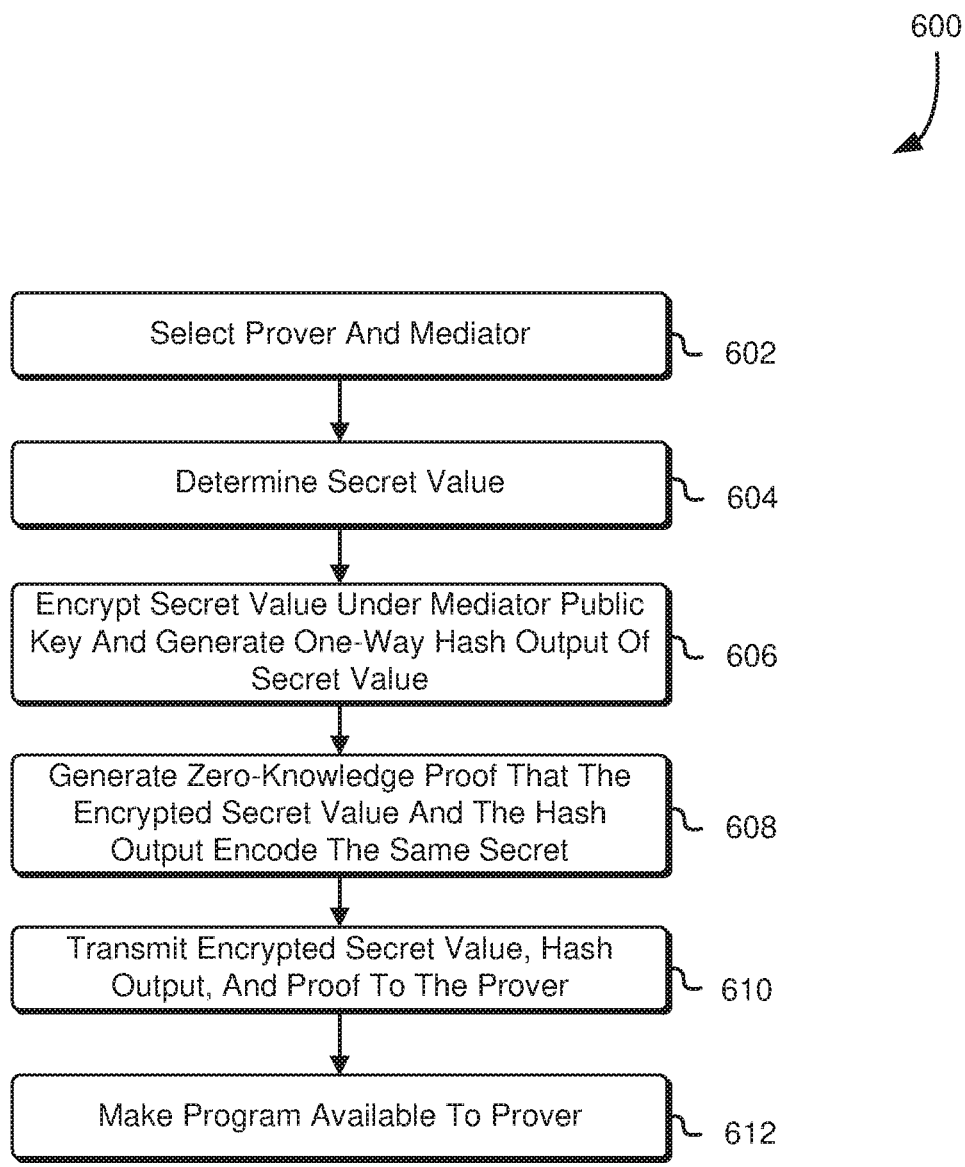
FIG. 6 is an illustrative diagram of a process to request execution of a program, according to a protocol.

FIG. 6 illustrates a flowchart 600 of a process in accordance with a protocol described in this disclosure. The flowchart may be implemented in accordance with embodiments described elsewhere in this disclosure, such as FIGS. 1, 4, and 12. The process may be implemented by the same system that implements the process described in connection with FIG. 7. The process may be implemented by a client as described elsewhere in this disclosure or by any other suitable computing entity. The suitable system (e.g., client as described in connection with FIG. 4) comprises one or more processors and memory that includes executable instructions that, if executed, cause the one or more processors to perform at least part of the process described in connection with FIG. 6.

As part of the process, the system may select 602 a suitable prover and mediator. In an embodiment, a client issues a request, through a program execution platform requesting execution of a program (e.g., a smart contract). The request may include an indication of the program (e.g., including information on the computational complexity or expected run time of the program, a fee that corresponds to digital assets the client is willing to transfer control of for execution of the program, and more). One or more prospective provers of the platform may provide a response to the request indicating that the prospective prover is willing to execute the program. In an embodiment, the platform includes a feedback system wherein prospective provers have ratings associated with past performance on the platform. For example, a prover may receive a positive rating for having correctly fulfilled past requests and negative ratings for failing to fulfil or incorrectly fulfilling past requests.

The ratings may include additional information, such as how often a prospective prover has used incorrect input data, has broadcasted a correction transaction, has been involved in a dispute that was resolved by a mediator, and more. In an embodiment, the client selects the prover based at least in part on the ratings associated with the prospective prover s (e.g., the prover has the highest rating of all responding provers).

In an embodiment, the client determines 604 a secret value x. The secret value may refer to a value that the client does not reveal to the prover until the client determines that the prover executed a program (e.g., smart contract) and verifies that the program was executed correctly. Verifying correct execution of the program may include determining whether the correct input data was used to control execution of the program.

The system may obtain a public key associated with the mediator computer system and encrypt 606 the secret value under the mediator's public key, thereby generating an encrypted secret value $Enc_{Mediator}(x)$. The system may use the secret value as an input to a cryptographic hash algorithm such as a SHA-256 cryptographic hash algorithm to generate 606 an output y=H(x). Generally speaking, a pre-image resistant function such as a one-way function may be utilized in place of a cryptographic hash function as described in this context. The system may also generate 608 a zero-knowledge proof that the encrypted secret value $Enc_{Mediator}(x)$ and the output y encode the same secret. The zero-knowledge proof may be computationally verifiable by computing entities that do not have access to the shared value (e.g., computer systems that do not have access to the secret value x are still able to computationally verify that $Enc_{Mediator}(x)$ and y are generated from the same value).

After generating the aforementioned data, the system may transmit 610 the encrypted secret value, the hash output, and the zero-knowledge proof to the prover. This information may be made available to the prover in any suitable manner, such as by providing the information across multiple data packets, by storing the data in a location accessible to the prover and providing a reference (e.g., a uniform resource identifier) to the location.

The client may make a program available 612 to the prover. The program may refer to a program that the client requests that the prover execute. The program may be a smart contract whose execution is dependent upon input data that may be obtainable from a blockchain network or an off-chain data source such as those described in connection with FIG. 3. In an embodiment, the client makes the program available to the prover by broadcasting a funding transaction that encodes a reference to the program, wherein the funding transaction is in accordance with those described in connection with, for example, FIG. 5. The funding transaction and/or the program may be broadcasted by the client in response to detecting that the prover broadcasted a security deposit transaction to the blockchain network. The prover may execute the program according to processes described in accordance with FIGS. 8 and 9.

Figure 7:
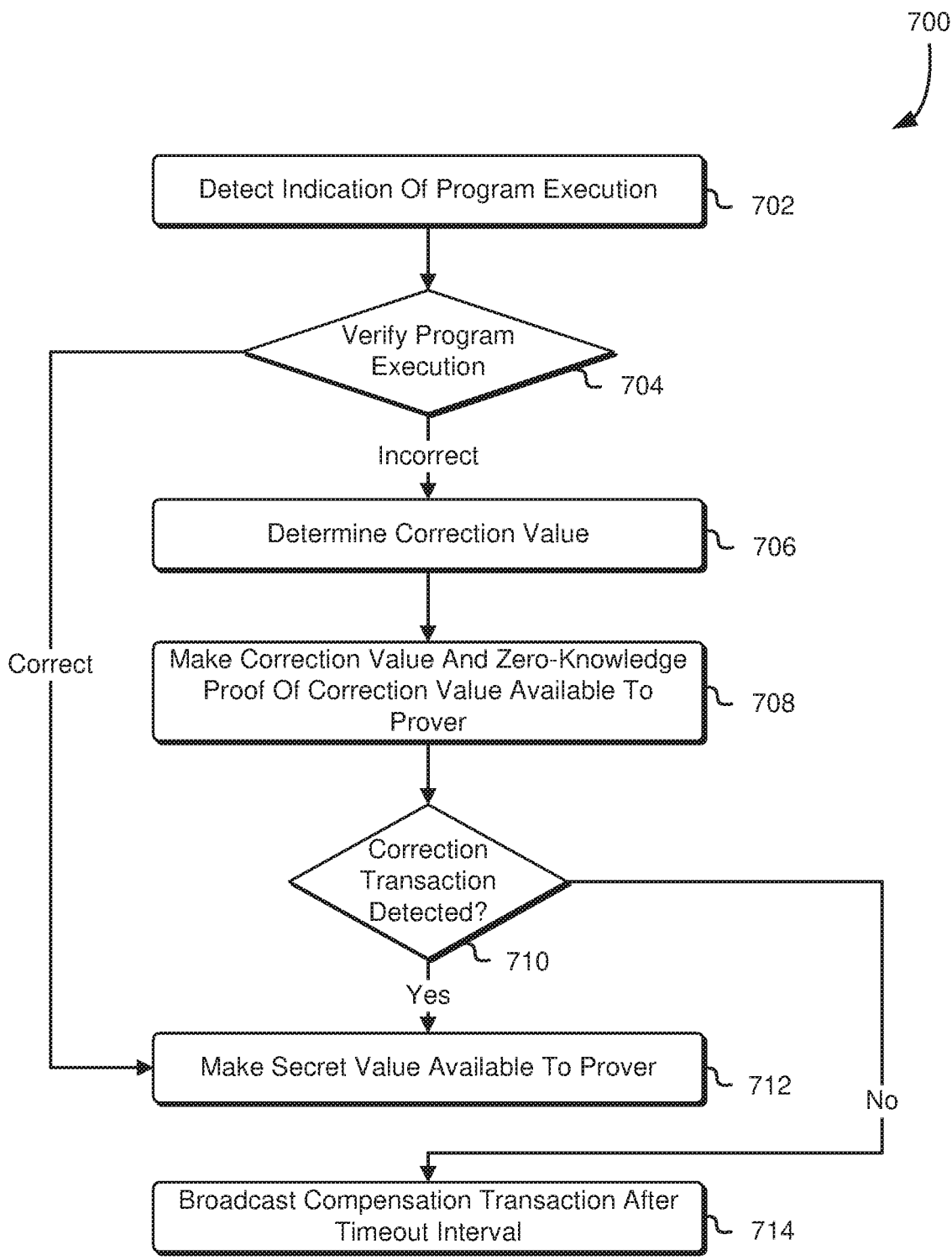
FIG. 7 is an illustrative diagram of a process to verify correct execution of a program, according to a protocol.

FIG. 7 illustrates a flowchart 700 of a process in accordance with a protocol described in this disclosure. The flowchart may be implemented in accordance with embodiments described elsewhere in this disclosure, such as FIGS. 1, 4, and 12. The process may be implemented by the same system that implements the process described in connection with FIG. 6. The process may be implemented by a client as described elsewhere in this disclosure or by any other suitable computing entity. The suitable system (e.g., client as described in connection with FIG. 4) comprises one or more processors and memory that includes executable instructions that, if executed, cause the one or more processors to perform at least part of the process described in connection with FIG. 7.

The system, may detect 702 an indication that the program (e.g., as described in FIG. 6) was executed. In some embodiment, the prover broadcasts an unlocking transaction that indicates execution of the program. The indication may include a proof-of-correctness or a proof of correct execution of the program. The indication may also include a proof-of-communications between the prover and a data provider. Execution of the program may be controlled by one or more inputs, whose values may be determined based on data external to the blockchain network.

Upon detecting the indication, the system may verify 704 execution of the program. In some cases, the system delegates the verification steps to another computer system, such as a verifier computer system described in connection with FIG. 3. Verifying program execution may include verifying that the program was run to completion and generated an output, verifying validity of a proof-of-correctness generated by the prover, verifying that an input to the program has a correct value, and more. If the system determines that the program (e.g., smart contract) was executed correctly and validly, the system may make available 712 to the prover a secret value x. Generally speaking, the system may make the secret value x available to the prover upon determining that the prover has performed various steps (e.g., correct execution of the program) according to a protocol. The secret value x may be used by the prover to reclaim digital assets encumbered by a security transaction. In some cases, the client and the prover cooperatively generate a multi-party signature that releases digital assets to the prover as a fee for executing the program.

If the system determines that the program was not executed correctly, the system may determine that the incorrect execution is attributed to the use of an incorrect input value for example, the input to the program may differ from an expected input value that was obtained from a data feed as described above in connection with FIG. 3. The system may determine 706 a correction value, which may be based on the difference between the actual input value used to execute the program and an expected input value obtained from a data feed. In an embodiment, the correction value can be expressed through a metric denoting the weighted Hamming distance: $d_{WH}(u,v) = \Sigma_{i=1}^{m} d_{WH}(u_i, v_i)$, where u=u[1 ... m], v=v[1 ... m] where u and v are the strings to compare. In an embodiment, the correction value may reflect an amount of damage suffered by the client that is based on the difference in the expected and actual execution of smart contract, the cost of verifying the program execution, and more. The system may transmit or otherwise make available 708 the correction value to the prover the system may also generate and make available a zero-knowledge proof of the correction value.

After sending the correction value to the prover, the system may determine whether 710 a correction transaction was detected. A correction transaction may refer to a transaction that is broadcasted by the prover to a blockchain network that is an acknowledgement that the program was executed incorrectly and may be a correction to the incorrect execution of the program. For example, in some cases, the correction transaction includes a transfer of digital assets amounting to the difference between what the system was to have received under correct execution of the program and what the system received under the actual incorrect execution of the program.

If the correction transaction is detected, the system may provide or otherwise make available 712 the secret value x to the prover. If a correction transaction is not detected after a timeout interval $t_w$, a different transaction (e.g., a compensation transaction) may be broadcasted by the client to claim digital assets encumbered by a security deposit transaction on behalf of the client.

Figure 8:
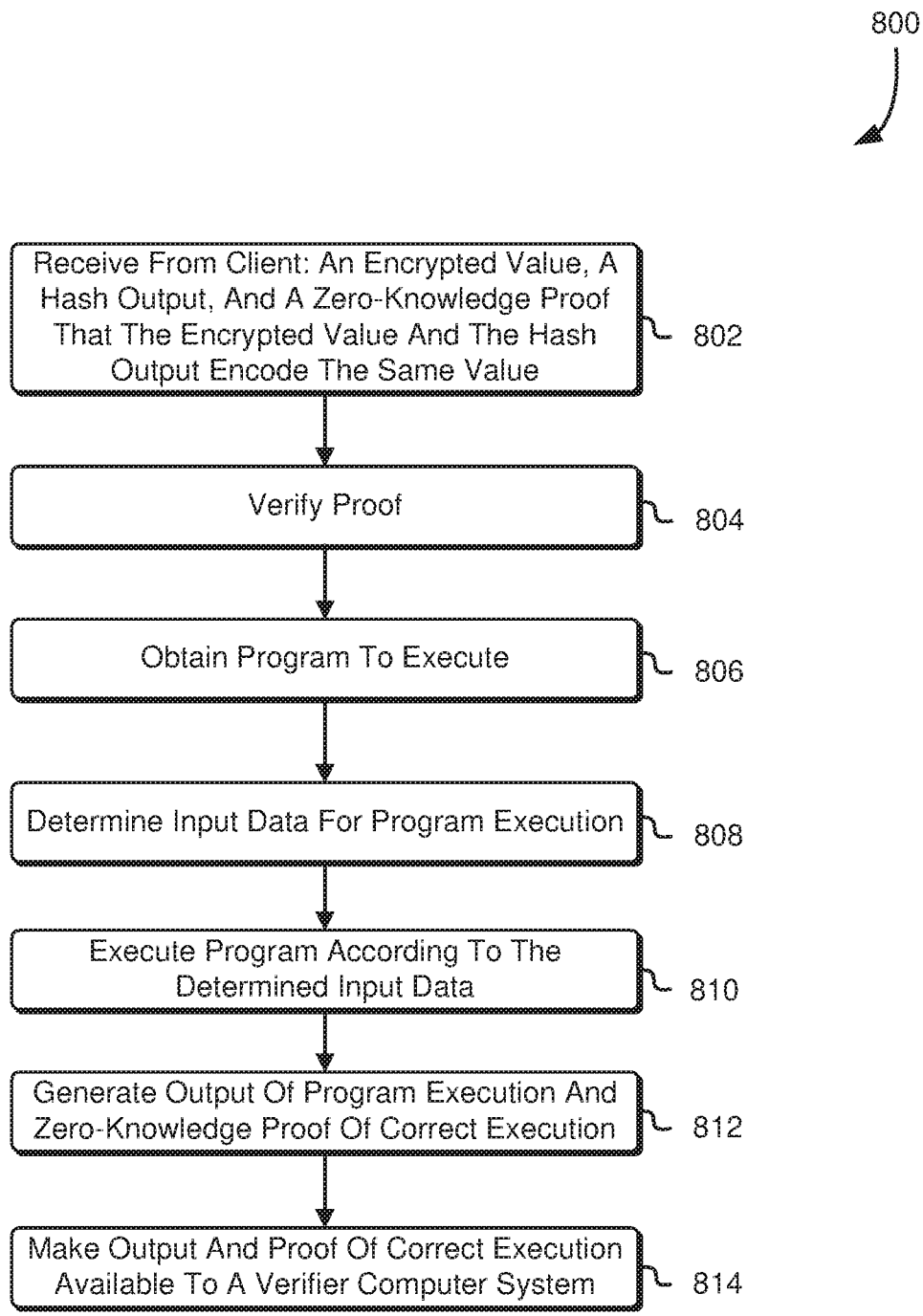
FIG. 8 is an illustrative diagram of a process for fulfilling a request for execution of a program, according to a protocol.

FIG. 8 illustrates a flowchart 800 of a process in accordance with a protocol described in this disclosure. The flowchart may be implemented in accordance with embodiments described elsewhere in this disclosure, such as FIGS. 1, 4, and 12. The process may be implemented by the same system that implements the process described in connection with FIG. 9. The process may be implemented by a prover as described elsewhere in this disclosure or by any other suitable computing entity. The suitable system (e.g., prover as described in connection with FIG. 4) comprises one or more processors and memory that includes executable instructions that, if executed, cause the one or more processors to perform at least part of the process described in connection with FIG. 8.

The prover may receive 802 or otherwise obtain an encrypted value, a hash output, and a zero-knowledge proof that the encrypted value and the hash output are derived from the same value. The prover may receive this data directly from the client (e.g., via a message transmitted by the client to the prover), or indirectly (e.g., by the client broadcasting the data to a blockchain network, storing the data in a data storage location and providing a link to the location). The prover may verify 804 the zero-knowledge proof.

The prover may obtain 806 a program to execute. A reference to the program may be encoded in a funding transaction as described elsewhere in this disclosure. The system may, furthermore, determine 808 input data for the execution of the program. For example, the input data may be data that is obtained directly from the blockchain network or from a data feed over a network as described in connection with FIG. 3. In an embodiment, the prover executes 810 the program (e.g., smart contract) according to the input data. The system may, upon completing execution of the program, generate 812 an output of the program execution and also a proof-of-correctness. The output and the proof may be made available 814 to a verifier computer system in an unlocking transaction. The verifier computer system may be any suitable computer system for performing a verification process, such as the client described in connection with FIG. 4.

Figure 9:
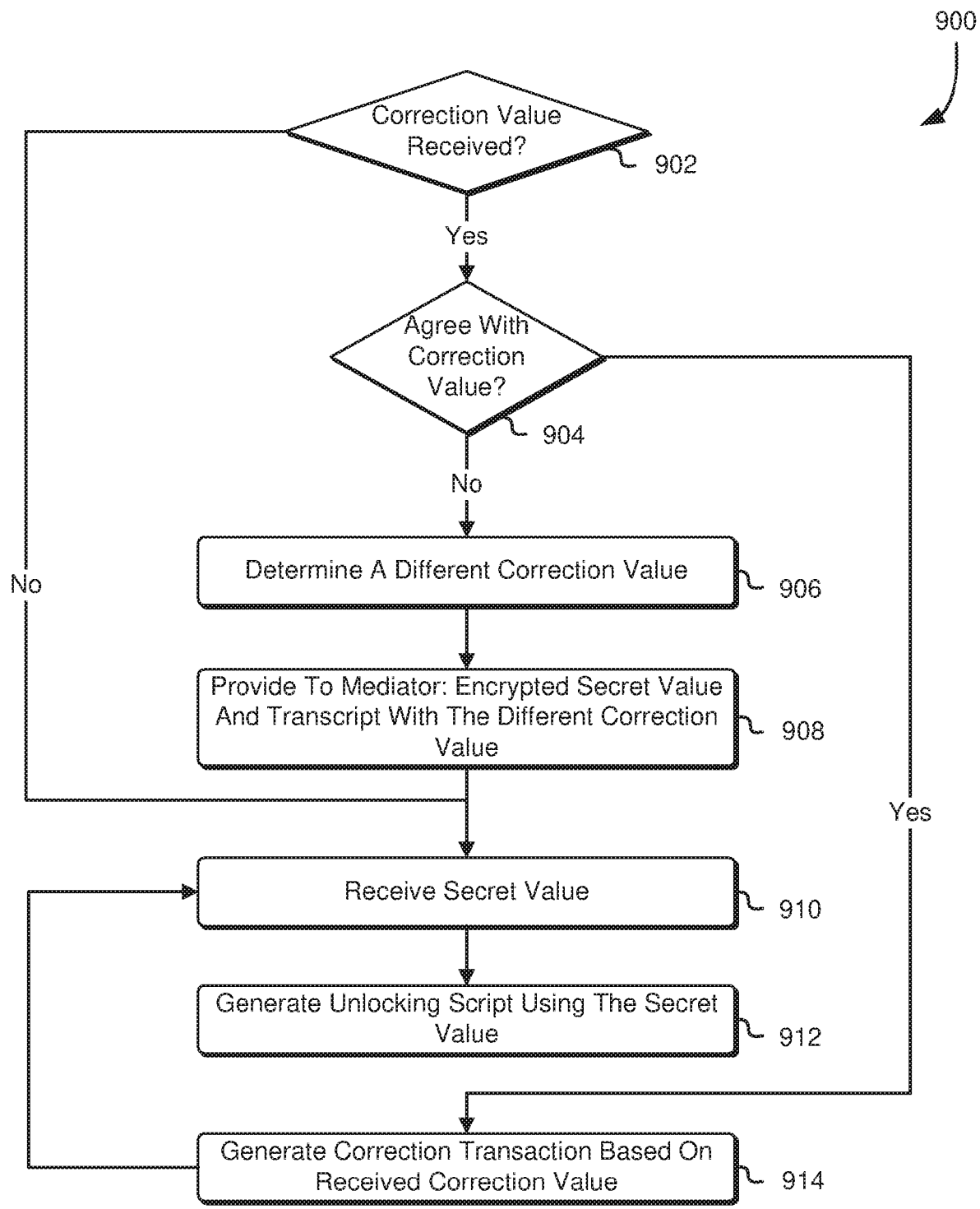
FIG. 9 is an illustrative diagram of a process for performing a correction routine, according to a protocol.

FIG. 9 illustrates a flowchart 900 of a process in accordance with a protocol described in this disclosure. The flowchart may be implemented in accordance with embodiments described elsewhere in this disclosure, such as FIGS. 1, 4, and 12. The process may be implemented by the same system that implements the process described in connection with FIG. 8. The process may be implemented by a prover as described elsewhere in this disclosure or by any other suitable computing entity. The suitable system (e.g., prover as described in connection with FIG. 4) comprises one or more processors and memory that includes executable instructions that, if executed, cause the one or more processors to perform at least part of the process described in connection with FIG. 9.

The prover may determine whether 902 a correction value is received. The prover may, according to a protocol, wait for a predetermined period of time for a correction value to be received, and if none is received within the period, implicitly determine that no correction value was received and/or the correction value is zero and that no correction transaction is needed. The correction value may be received from a client in response to the client or any suitable verifier determining incorrect execution of a program by the prover.

If the prover determines that no correction value was received and/or the correction value is zero, the prover subsequently receives 910 a secret value. The secret value may be usable to generate and/or execute an unlocking script that, if executed collectively with a locking script of a security transaction deposit, allows the prover to reclaim digital assets encumbered by the security deposit transaction. The secret value may also be used to redeem a worker fee of a funding transaction. It should be noted that if the client refuses to provide the secret value to the prover (i.e., the client violates the constraints of the protocol) then the prover may obtain the secret value from the mediator.

If the prover receives a correction value, the prover may determine whether 904 the correction value is computed correctly. The prover may obtain a zero-knowledge proof of the computation of the correction value and determine that the computation was computed correctly or incorrectly using the proof and/or perform a separate computation. In some cases, the prover always accepts the client's correction value as being computed correctly. If the system determines the correction value was computed correctly and that the value is correct, the prover may generate 914 a correction transaction based at least in part on the correction value. For example, the correction transaction may be a transaction that is mined to the blockchain and transfers digital assets equivalent to the amount of the correction value. The system may then wait to receive 910 the secret value in the manner described above.

However, if the prover disagrees with the correction value provided, the system may determine 906 a different correction value (e.g., based on a separate computation). The prover may provide 908 the mediator with the encrypted secret value and a transcript that is usable to mediate the dispute between the prover and client with regard to which correction value is correct. The transcript may comprise information such as the correction value and corresponding zero-knowledge proof as computed by the prover and/or client, one or more input values used to generate a correction value, and/or a proof-of-communications. The mediator may determine that the different correction value calculated by the prover is correct, decrypt the encrypted secret value, and provide the secret value to the prover.

In some cases, the method for computing the damage value is agreed upon at an early stage of the protocol between the client and the prover, such as when the client selects the prover to perform the computation. The client may, in an embodiment, transmit to as part of a request to a prospective prover both a program to run and an equation that is used to calculate damage caused by an incorrect execution of the program. In an embodiment, the prover has knowledge of the equation for calculating the damage value prior to determining whether to agree to execute the program. In some cases, the mediator receives the equation from the client, prover, or both, and the equation may be digitally signed by either or both parties the protocol may require that the mediator receive the same equation from both the client and prover, and if the equations are different, to terminate the protocol.

Figure 10:
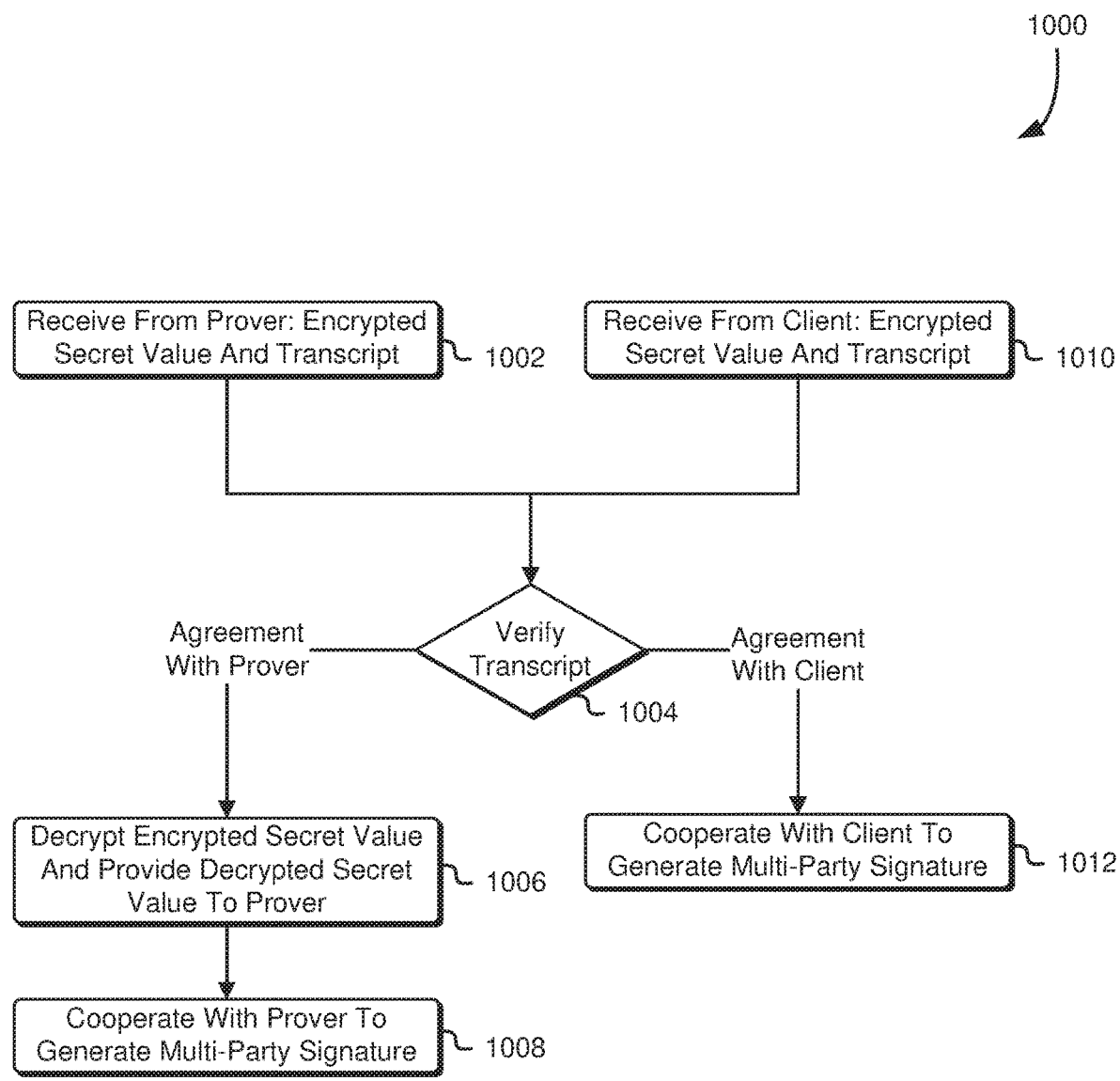
FIG. 10 is an illustrative diagram of a process for mediating a dispute, according to a protocol.

FIG. 10 illustrates a flowchart 1000 of a process in accordance with a protocol described in this disclosure. The flowchart may be implemented in accordance with embodiments described elsewhere in this disclosure, such as FIGS. 1, 4, and 12. The process may be implemented by a mediator computer system as described elsewhere in this disclosure or by any other suitable computing entity. The suitable system (e.g., prover as described in connection with FIG. 4) comprises one or more processors and memory that includes executable instructions that, if executed, cause the one or more processors to perform at least part of the process described in connection with FIG. 10. In an embodiment, the mediator also referred to as the mediator computer system is utilized by the client and/or prover of a protocol to resolve disputes. Disputes may arise between the client and prover when one or both parties fail to follow a protocol, such as failure to perform a step or failure to perform a step correctly.

In an embodiment, a prover initiates a dispute with the mediator and the mediator receives 1002, from the prover, an encrypted secret value and a transcript. The encrypted secret value may be encrypted under a public key of the mediator, wherein the mediator has access to the corresponding private key. The transcript may comprise information that is usable to adjudicate a dispute. For example, the transcript may include a zero-knowledge proof attesting to a particular state and/or value. The mediator may verify the transcript in any suitable manner, such as by verifying correctness of a proof. The mediator may delegate some or all steps of the verification process to another computing system, such as a node of a blockchain network. If the mediator agrees with the prover (e.g., the correctness of a proof attesting to a state or value asserted by the prover), the mediator may decrypt 1006 the encrypted secret value and provide the secret value to the prover.

Furthermore, the mediator may cooperate 1008 with the prover to generate one or more multi-party signatures which may be used to execute one or more programs, such as programs that are usable to redeem a worker fee of a locking transaction. However, if the mediator instead agrees with the client, the mediator may cooperate 1012 with the client to generate one or more multi-party signatures which may be utilized to execute various programs such as a program to claim digital assets posted by prover (e.g., as a penalty for failing to follow the protocol) and/or a program to reclaim a worker fee of a locking transaction.

In a similar manner, a client may initiate a dispute resolution routine with the mediator by providing the mediator with the encrypted secret value and a transcript. The transcript may include information such as a zero-knowledge proof. The mediator may receive 1010 the encrypted secret value and transcript and adjudicate the dispute by applying the techniques described above.

Figure 11:
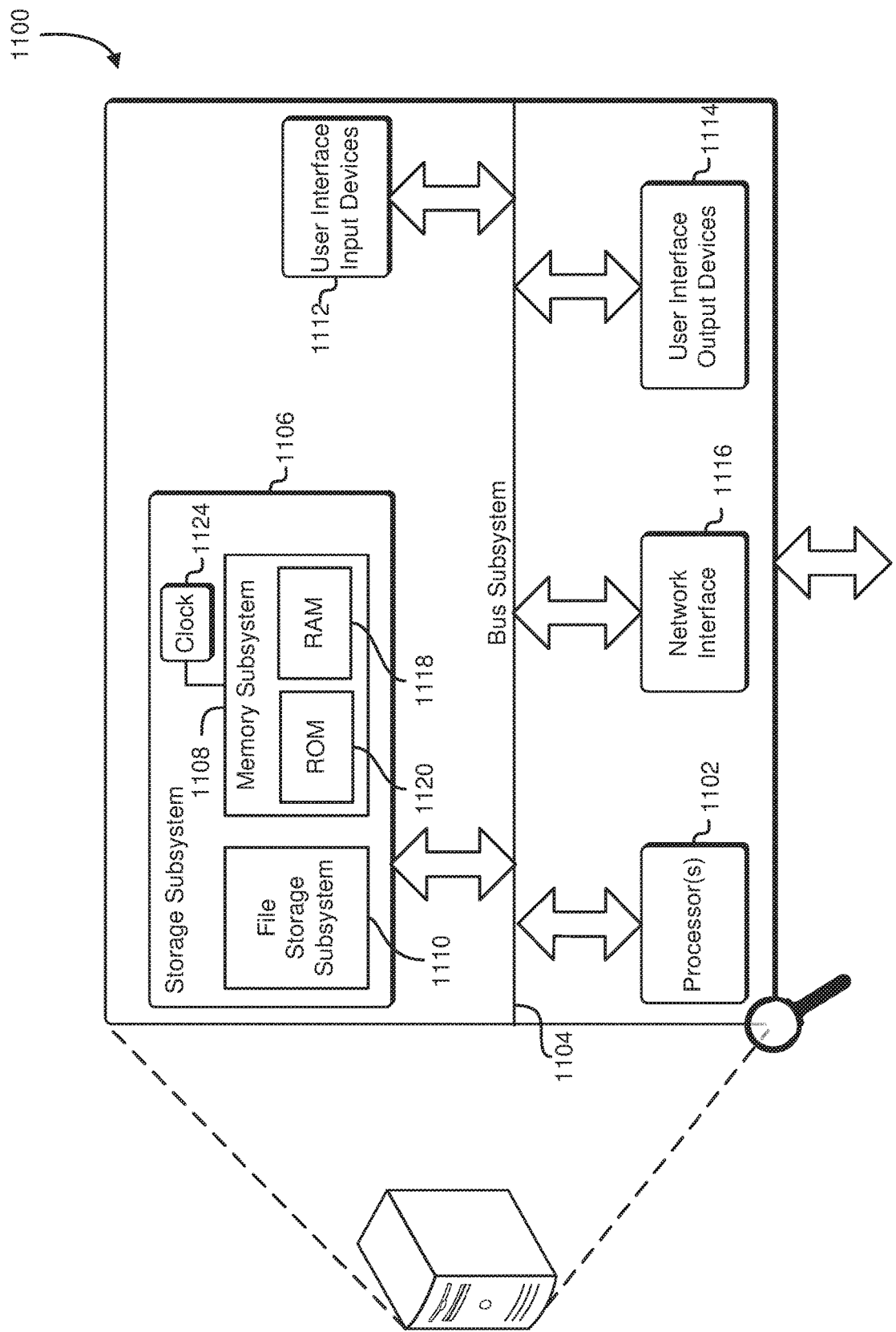
FIG. 11 illustrates a computing device that can be used to practice at least one embodiment of the present disclosure.

FIG. 11 is an illustrative, simplified block diagram of a computing device 1100 that can be used to practice at least one embodiment of the present disclosure. In various embodiments, the computing device 1100 can be used to implement any of the systems illustrated and described above. For example, the computing device 1100 can be configured for use as a data server, a web server, a portable computing device, a personal computer, or any electronic computing device. As shown in FIG. 11, the computing device 1100 could include one or more processors 1102 that, in embodiments, are configured to communicate with and are operatively coupled to a number of peripheral subsystems via a bus subsystem 1104. In some embodiments, these peripheral subsystems include a storage subsystem 1106 comprising a memory subsystem 1108 and a file/disk storage subsystem 1110, one or more user interface input devices 1112, one or more user interface output devices 1114, and a network interface subsystem 1116. Such storage subsystem 1106 could be used for temporary or long-term storage of information.

In some embodiments, the bus subsystem 1104 provides a mechanism for enabling the various components and subsystems of computing device 1100 to communicate with each other as intended. Although the bus subsystem 1104 is shown schematically as a single bus, alternative embodiments of the bus subsystem utilize multiple busses. In some embodiments, the network interface subsystem 1116 provides an interface to other computing devices and networks. The network interface subsystem 1116, in some embodiments, serves as an interface for receiving data from and transmitting data to other systems from the computing device 1100. In some embodiments, the bus subsystem 1104 is utilised for communicating data such as details, search terms, and so on.

In some embodiments, the user interface input devices 1112 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 1100. In some embodiments, the one or more user interface output devices 1114 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1100. The one or more user interface output devices 1114 can be used, for example, to present user interfaces to facilitate user interaction with applications performing processes described and variations therein, when such interaction may be appropriate.

In some embodiments, the storage subsystem 1106 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 1106. These application modules or instructions can be executed by the one or more processors 1102. In various embodiments, the storage subsystem 1106 additionally provides a repository for storing data used in accordance with the present disclosure. In some embodiments, the storage subsystem 1106 comprises a memory subsystem 1108 and a file/disk storage subsystem 1110.

In embodiments, the memory subsystem 1108 includes a number of memories, such as a main random access memory (RAM) 1118 for storage of instructions and data during program execution and/or a read only memory (ROM) 1120, in which fixed instructions can be stored. In some embodiments, the file/disk storage subsystem 1110 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 1100 includes at least one local clock 1124. The local clock 1124, in some embodiments, is a counter that represents the number of ticks that have transpired from a particular starting date and, in some embodiments, is located integrally within the computing device 1100. In various embodiments, the local clock 1124 is used to synchronize data transfers in the processors for the computing device 1100 and the subsystems included therein at specific clock pulses and can be used to coordinate synchronous operations between the computing device 1100 and other systems in a data centre. In another embodiment, the local clock is a programmable interval timer.

The computing device 1100 could be of any of a variety of types, including a portable computer device, tablet computer, a workstation, or any other device described below. Additionally, the computing device 1100 can include another device that, in some embodiments, can be connected to the computing device 1100 through one or more ports (e.g., USB, a headphone jack, Lightning connector, etc.). In embodiments, such a device includes a port configured to accept a fibre-optic connector. Accordingly, in some embodiments, this device is configured to convert optical signals to electrical signals that are transmitted through the port connecting the device to the computing device 1100 for processing. Due to the ever-changing nature of computers and networks, the description of the computing device 1100 depicted in FIG. 11 is intended only as a specific example for purposes of illustrating the preferred embodiment of the device. Many other configurations having more or fewer components than the system depicted in FIG. 11 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising", "having", "including", and "containing" are to be construed as open-ended terms (i.e., meaning "including, but not limited to") unless otherwise noted. The term "connected", when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset", unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C", or "at least one of A, B and C", unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law.

Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like do not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A computer-implemented method comprising:
   encrypting a secret value under a public key associated with a mediator computer system;
   generating a cryptographic hash output based at least in part on the secret value;
   generating an attestation that the encrypted secret value and the cryptographic hash output are both determined based at least in part on the secret value;
   providing the encrypted secret value, the cryptographic hash output and the attestation to a worker computer system, wherein the worker computer system is operable to use the attestation to determine whether the encrypted secret value and the cryptographic hash output are based at least in part on a same value, wherein the encrypted secret value is usable by the worker computer system and the mediator computer system to collectively execute a first program;
   causing a second program to be made available on a blockchain data structure, wherein execution of the second program has an input obtained from a trusted authority source external to the blockchain data structure;
   determining that the blockchain data structure reflects:
   a proof of correct execution of the second program; and
   an input value, wherein execution of the second program to generate the proof is based at least in part on using the input value as the input to the second program;
   determining, based at least in part on the proof, that the input is valid; and
   in response to determining that the input value is valid, providing by the mediator computer system, the secret value to the worker computer system, wherein the worker computer system is able to execute the first program using at least the secret value.

2. The computer-implemented method according to claim 1, wherein the attestation is a zero-knowledge proof and correctness of the zero-knowledge proof is computationally verifiable by the worker computer system.

3. The computer-implemented method according to claim 1, further comprising: obtaining a second attestation, the second attestation comprising a set of communications between the worker computer system and a data source, the set of communications usable to determine whether the input value is valid, wherein the second attestation is digitally signed by the data source; verifying authenticity of the second attestation using at least a public key associated with the data source; and determining whether the input is valid based at least in part on the set of communications.

4. The computer-implemented method according to claim 1, wherein the input value is a first input value and the method further comprises, in response to determining the first input value is incorrect:
   calculating a second input value based at least in part on the first input value;
   providing the second input value to the worker computer system; and
   in response to determining that the worker computer system executed a third program using the second input value, providing the secret value to the worker computer system.

5. The computer-implemented method according to claim 4, wherein calculating the second input value comprises calculating a Hamming distance.

6. The computer-implemented method according to claim 4, further comprising, in response to determining that the worker computer system failed to execute the third program using the second input value within a time threshold, causing a fourth program to be made available to the blockchain data structure, the fourth program usable to gain control of a digital asset.

7. The computer-implemented method according to claim 6, wherein the time threshold encodes an earliest time at which a blockchain transaction comprising a portion of the fourth program can be mined to the blockchain data structure.

8. The computer-implemented method according to claim 6, further comprising:
   generating a digital signature; and
   encoding the digital signature to an unlocking script, wherein the unlocking script further encodes a purported digital signature associated with the worker computer system, wherein the fourth program comprises a locking script and the unlocking script and execution of the fourth program by one or more nodes of a blockchain network associated with the blockchain data structure comprises determining the digital signature and the purported digital signature are both valid.

9. The computer-implemented method according to claim 1, wherein causing the second program to be made available on the blockchain data structure comprises causing a blockchain transaction to be mined to the blockchain data structure, wherein the blockchain transaction comprises:
   information usable to determine the second program; and
   a locking script that encumbers digital assets, wherein collectively executing the locking script and an unlocking script releases encumbrance on the digital assets, collectively executing the locking script and the unlocking script comprises verifying two digital signatures are of a set of digital signatures comprising:
   a digital signature associated with a computing entity performing the computer-implemented method; a digital signature associated with the worker computer system; and a digital signature associated with the mediator computer system.

10. The computer-implemented method according to claim 1, wherein execution of the first program transfers control of a digital asset to the worker computer system.

11. The computer-implemented method according to claim 1, wherein:
the first program comprises a locking script and an unlocking script, wherein the unlocking script encodes a purported secret value and a purported digital signature associated with the worker computer system; and
execution of the first program by one or more nodes of a blockchain network associated with the blockchain data structure comprises determining the purported secret value and the purported digital signature are both valid.

12. The computer-implemented method according to claim 11, wherein the locking script comprises cryptographic hash output and determining the purported secret value and the purported digital signature are both valid comprises:
computing an output of a cryptographic hash algorithm using the purported secret value; and
determining the output and the cryptographic hash output match.

13. A system, comprising: a processor; and memory including executable instructions that, as a result of execution by the processor, causes the system to:
encrypt a secret value under a public key associated with a physical mediator computer system;
generate a cryptographic hash output based at least in part on the secret value;
generate an attestation that the encrypted secret value and the cryptographic hash output are both determined based at least in part on the secret value;
provide the encrypted secret value, the cryptographic hash output and the attestation to a physical worker computer system, wherein the worker computer system is operable to use the attestation to determine whether the encrypted secret value and the cryptographic hash output are based at least in part on a same value, wherein the encrypted secret value is usable by the worker computer system and the mediator computer system to collectively execute a first program;
cause a second program to be made available on a blockchain data structure, wherein execution of the second program has an input obtained from a trusted authority source external to the blockchain data structure;
determine that the blockchain data structure reflects:
a proof of correct execution of the second program; and
an input value, wherein execution of the second program to generate the proof is based at least in part on using the input value as the input to the second program;
determine, based at least in part on the proof, that the input is valid; and
in response to determining that the input value is valid, provide, by the mediator computer system, the secret value to the worker computer system, wherein the worker computer system is able to execute the first program using at least the secret value.

14. The system of claim 13 wherein the attestation is a zero-knowledge proof and correctness of the zero-knowledge proof is computationally verifiable by the worker computer system.

15. The system of claim 13 wherein the input value is a first input value and the memory further including executable instructions that, in response to determining the first input value is incorrect, causes the system to:
calculate a second input value based at least in part on the first input value;
provide the second input value to the worker computer system; and
in response to determining that the worker computer system executed a third program using the second input value, provide the secret value to the worker computer system.

16. A non-transitory computer-readable storage medium having stored thereon executable instructions that, as a result of being executed by a processor of a computer system, cause the computer system to at least:
encrypt a secret value under a public key associated with a mediator computer system;
generate a cryptographic hash output based at least in part on the secret value;
generate an attestation that the encrypted secret value and the cryptographic hash output are both determined based at least in part on the secret value;
provide the encrypted secret value, the cryptographic hash output and the attestation to a worker computer system, wherein the worker computer system is operable to use the attestation to determine whether the encrypted secret value and the cryptographic hash output are based at least in part on a same value, wherein the encrypted secret value is usable by the worker computer system and the mediator computer system to collectively execute a first program;
cause a second program to be made available on a blockchain data structure, wherein execution of the second program has an input obtained from a trusted authority source external to the blockchain data structure;
determine that the blockchain data structure reflects:
a proof of correct execution of the second program; and
an input value, wherein execution of the second program to generate the proof is based at least in part on using the input value as the input to the second program;
determine, based at least in part on the proof, that the input is valid; and in response to determining that the input value is valid, provide, by the mediator computer system, the secret value to the worker computer system, wherein the worker computer system is able to execute the first program using at least the secret value.

17. The non-transitory computer-readable storage medium of claim 16, wherein the attestation is a zero-knowledge proof and correctness of the zero-knowledge proof is computationally verifiable by the worker computer system.

* * * * *